Nov. 2, 1937.   E. N. WINSLOW   2,097,484
STRUCTURAL ASSEMBLY
Filed May 27, 1932   15 Sheets-Sheet 5

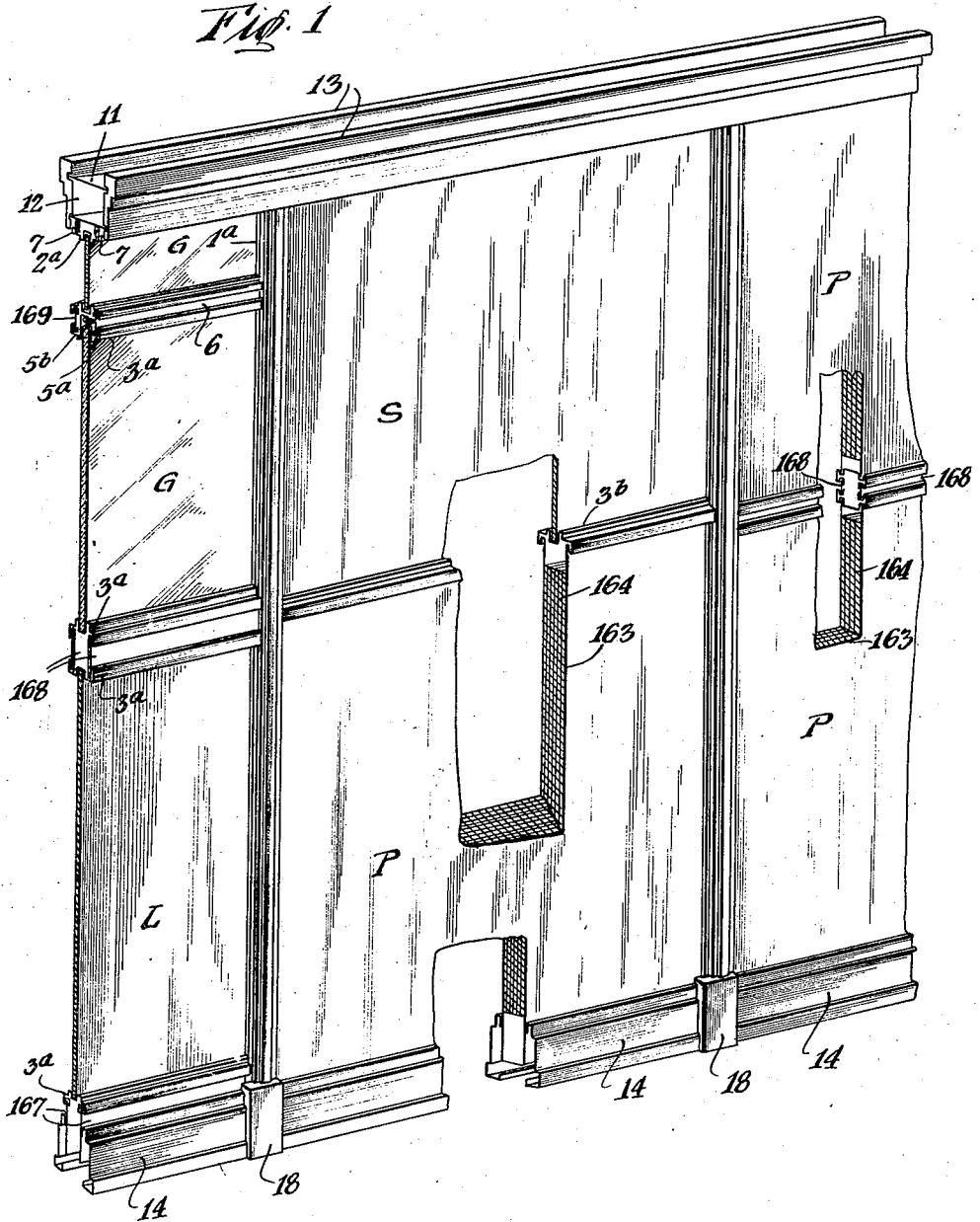

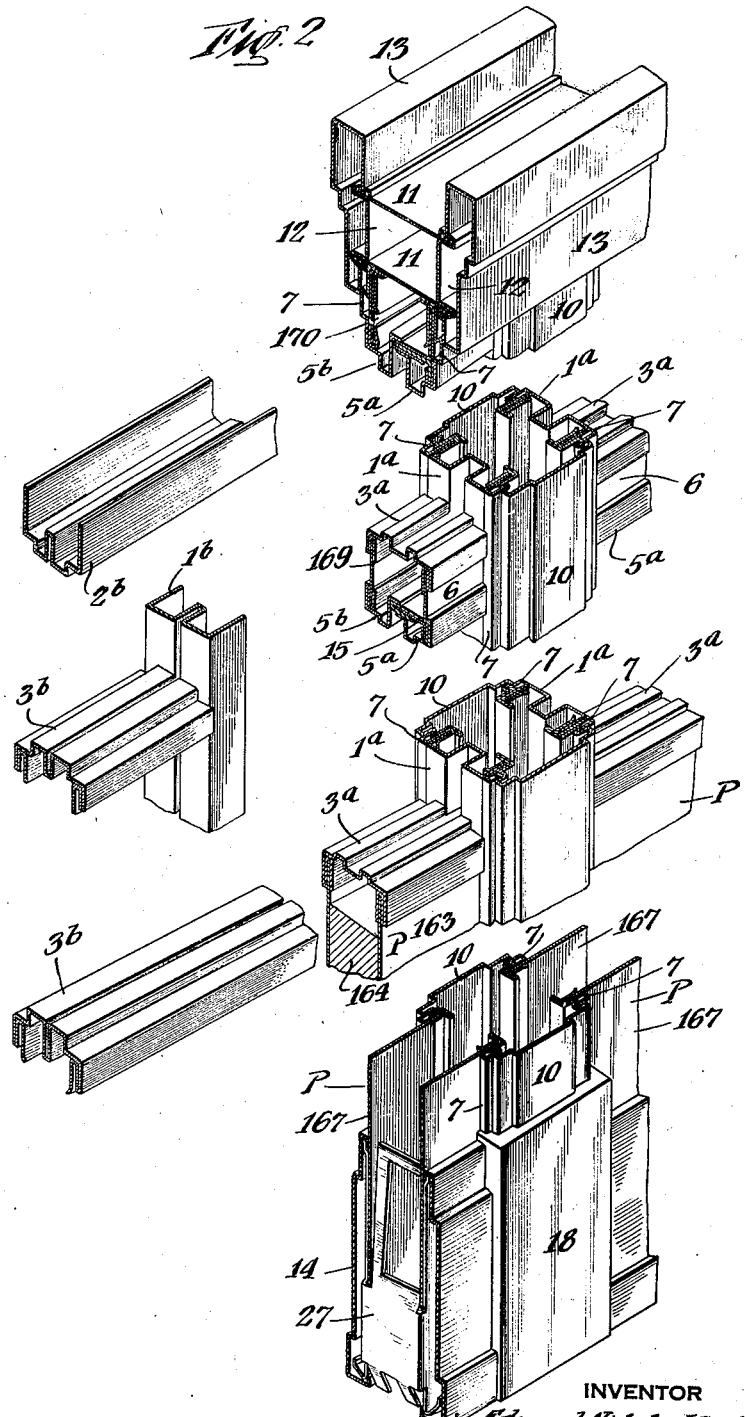

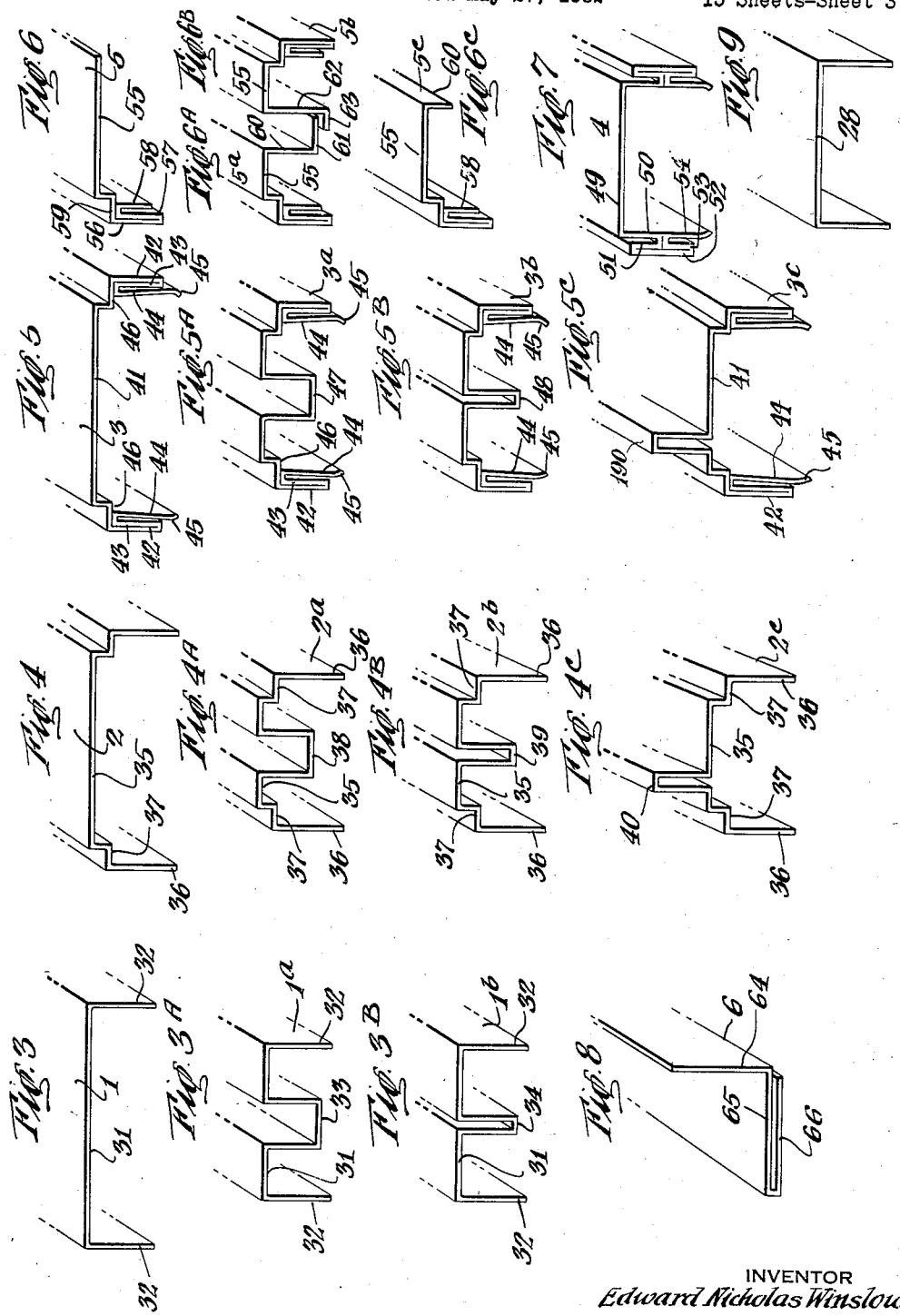

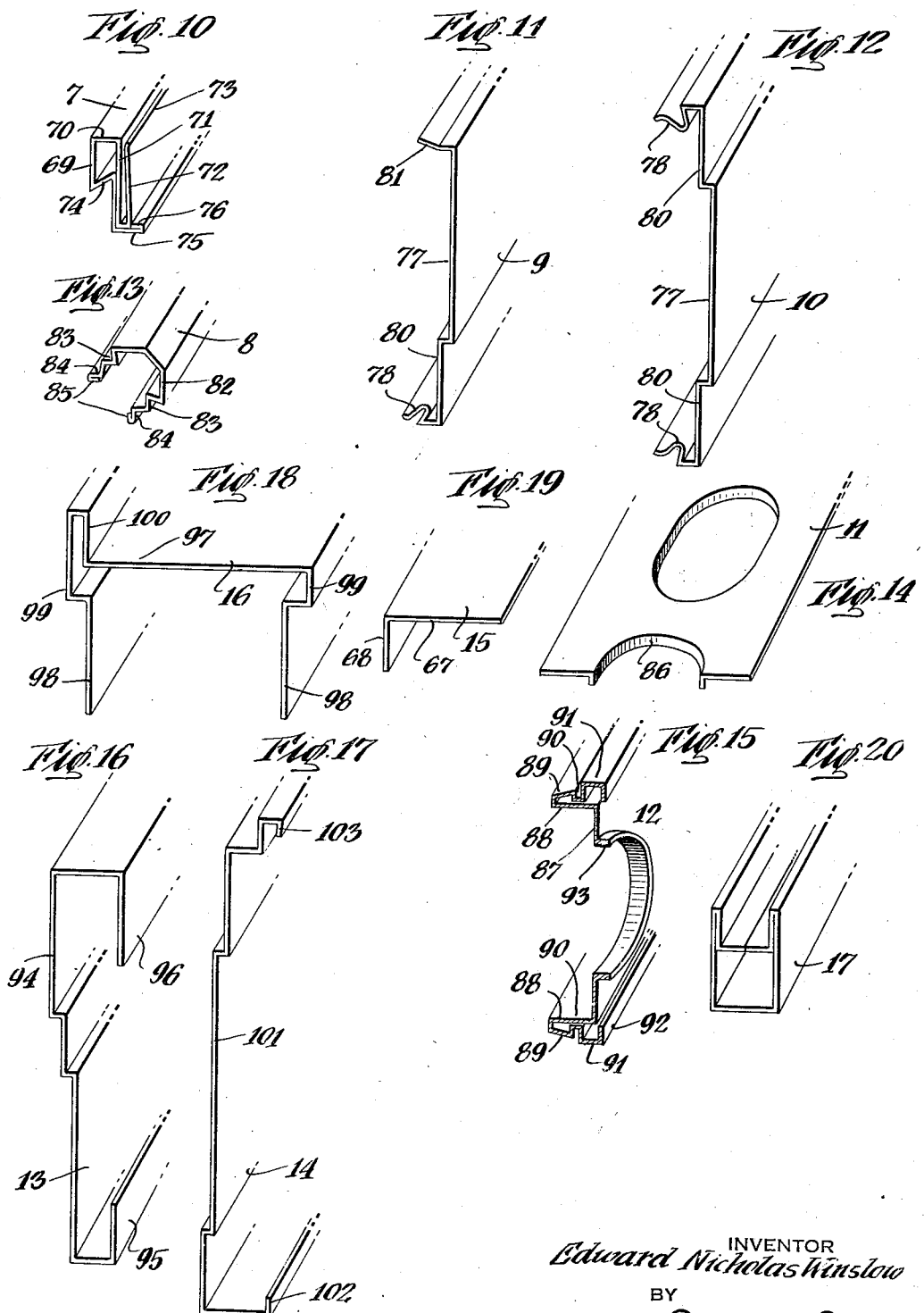

Edward Nicholas Winslow INVENTOR
BY
ATTORNEYS

Nov. 2, 1937.　　　　E. N. WINSLOW　　　　2,097,484
STRUCTURAL ASSEMBLY
Filed May 27, 1932　　15 Sheets-Sheet 6
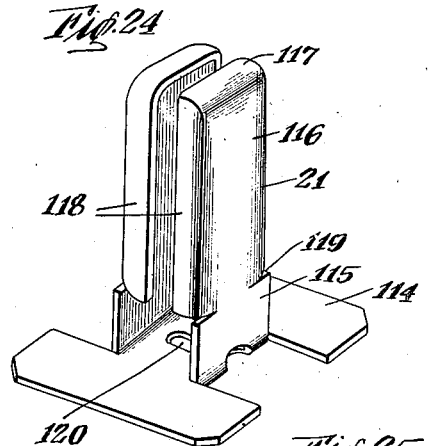
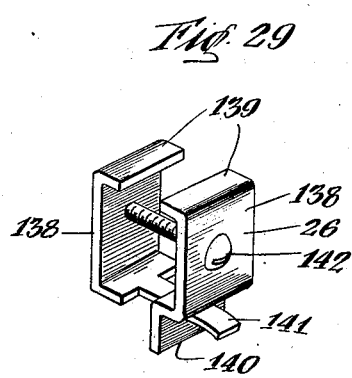
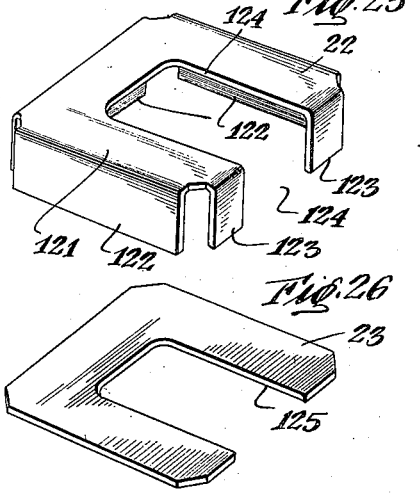
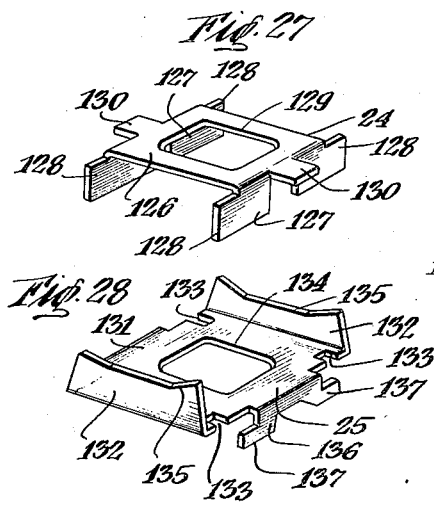
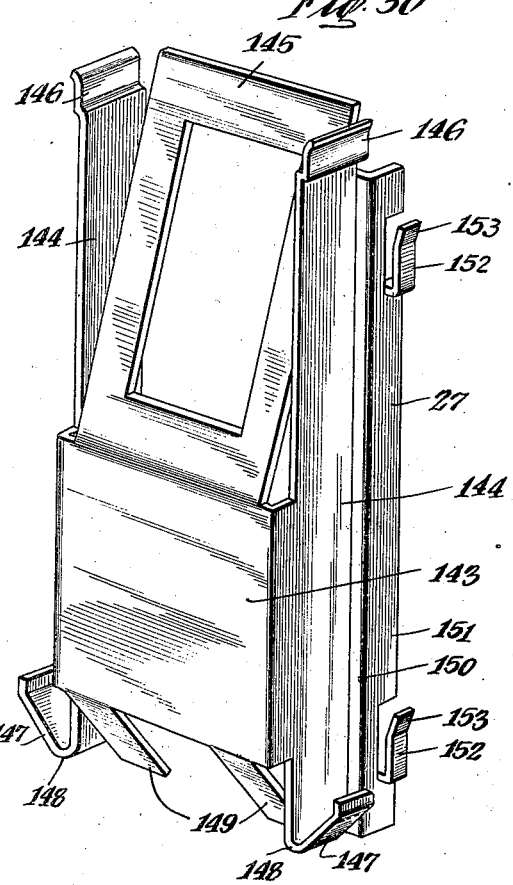
INVENTOR
Edward Nicholas Winslow
BY
Austin & Dix
ATTORNEYS Nov. 2, 1937. E. N. WINSLOW 2,097,484
STRUCTURAL ASSEMBLY
Filed May 27, 1932 15 Sheets-Sheet 8
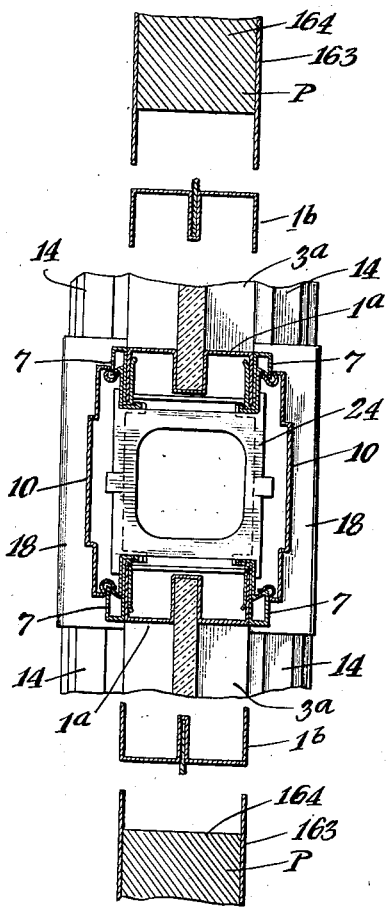
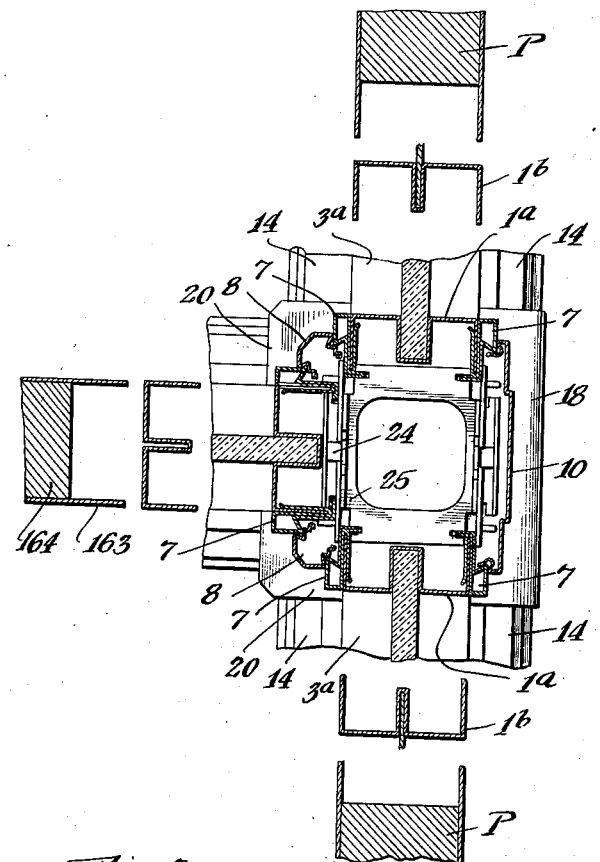
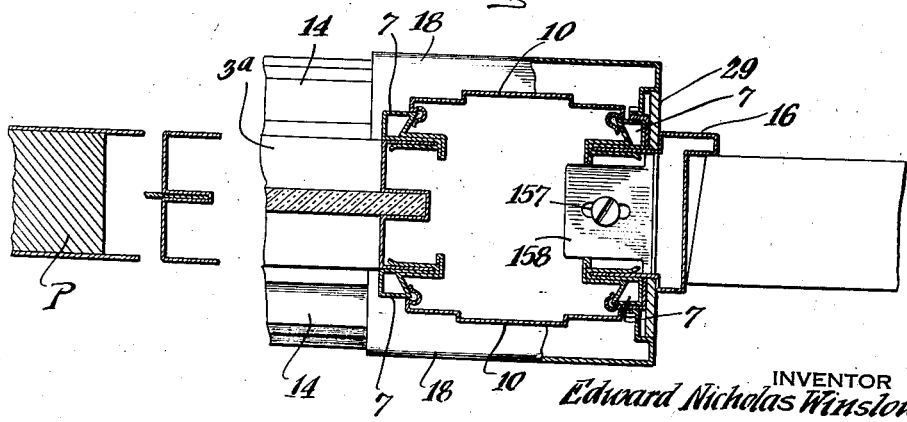
INVENTOR
Edward Nicholas Winslow
BY
Austin T Dix
ATTORNEYS

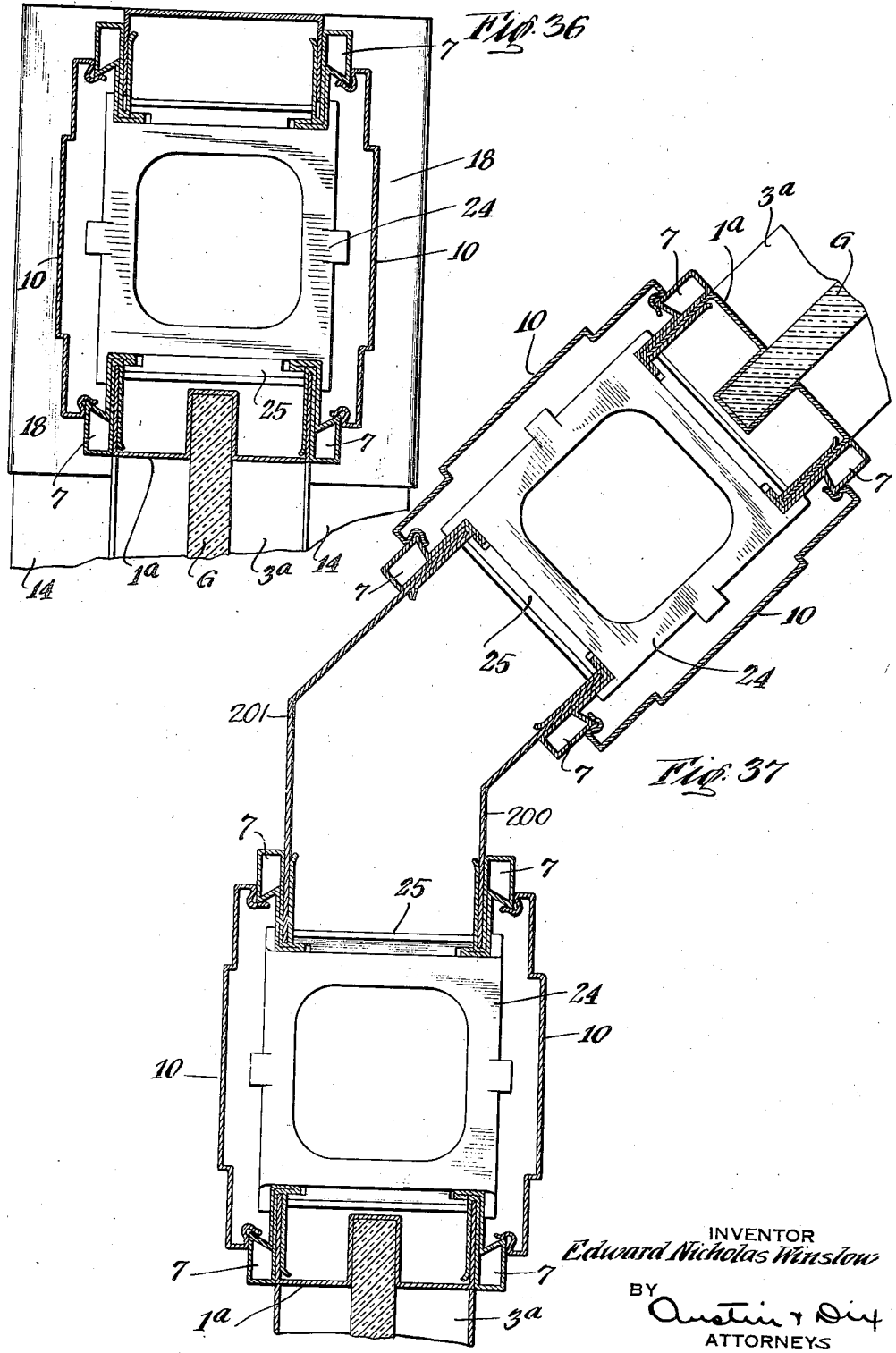

Nov. 2, 1937.  E. N. WINSLOW  2,097,484
STRUCTURAL ASSEMBLY
Filed May 27, 1932    15 Sheets-Sheet 10
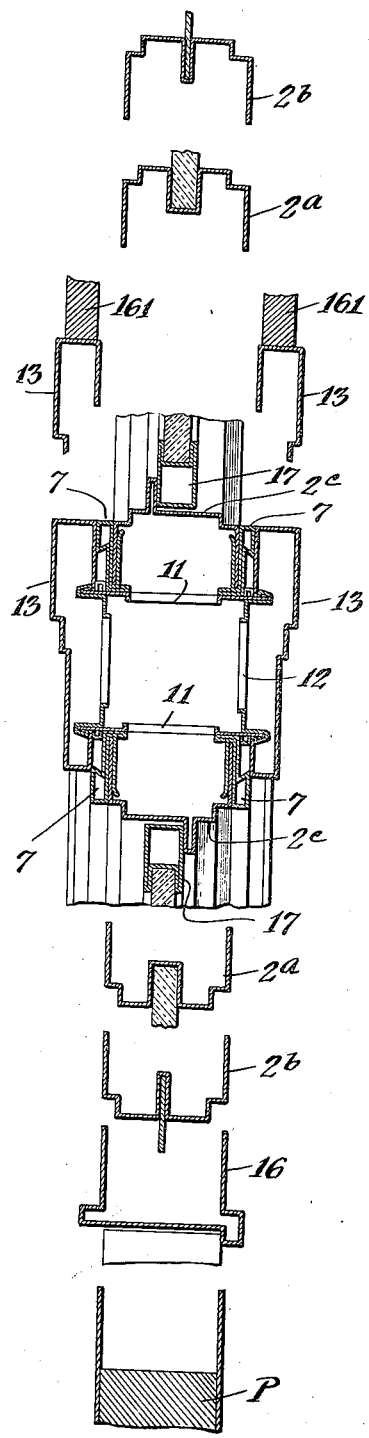
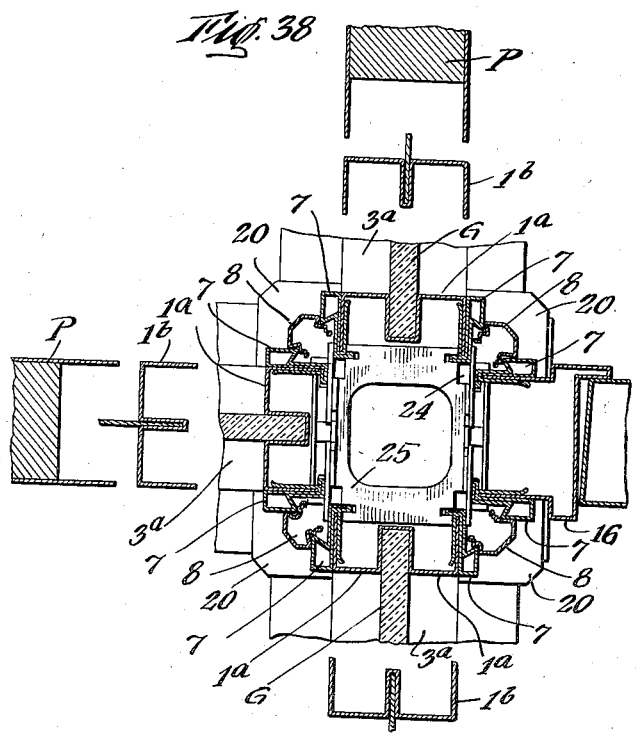
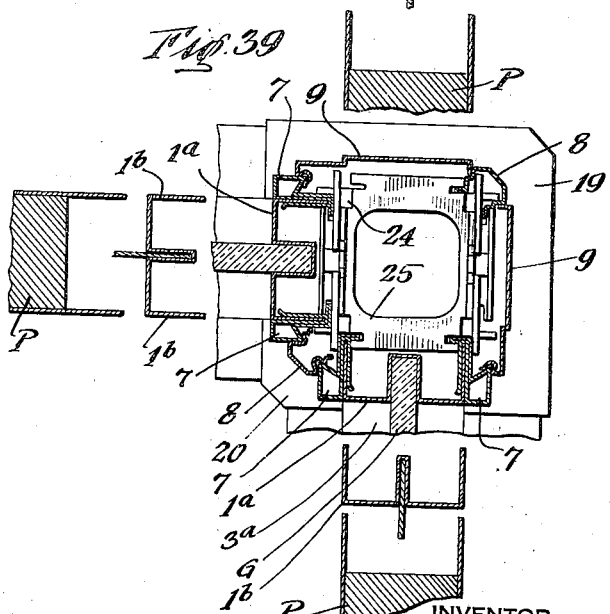
INVENTOR
Edward Nicholas Winslow
BY
ATTORNEYS Nov. 2, 1937.  E. N. WINSLOW  2,097,484
STRUCTURAL ASSEMBLY
Filed May 27, 1932   15 Sheets-Sheet 11
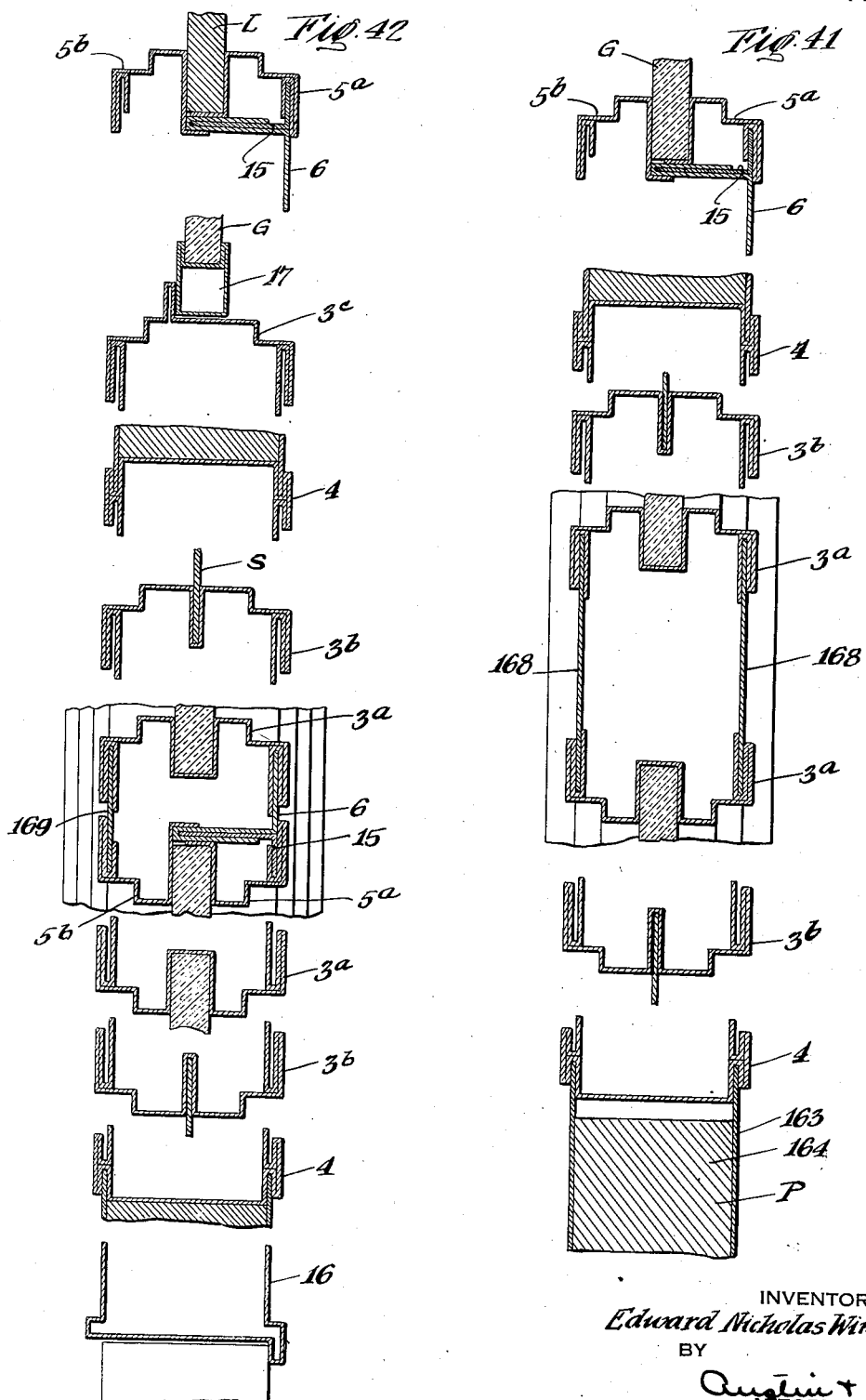
INVENTOR
Edward Nicholas Winslow
BY
Austin + Dix
ATTORNEYS

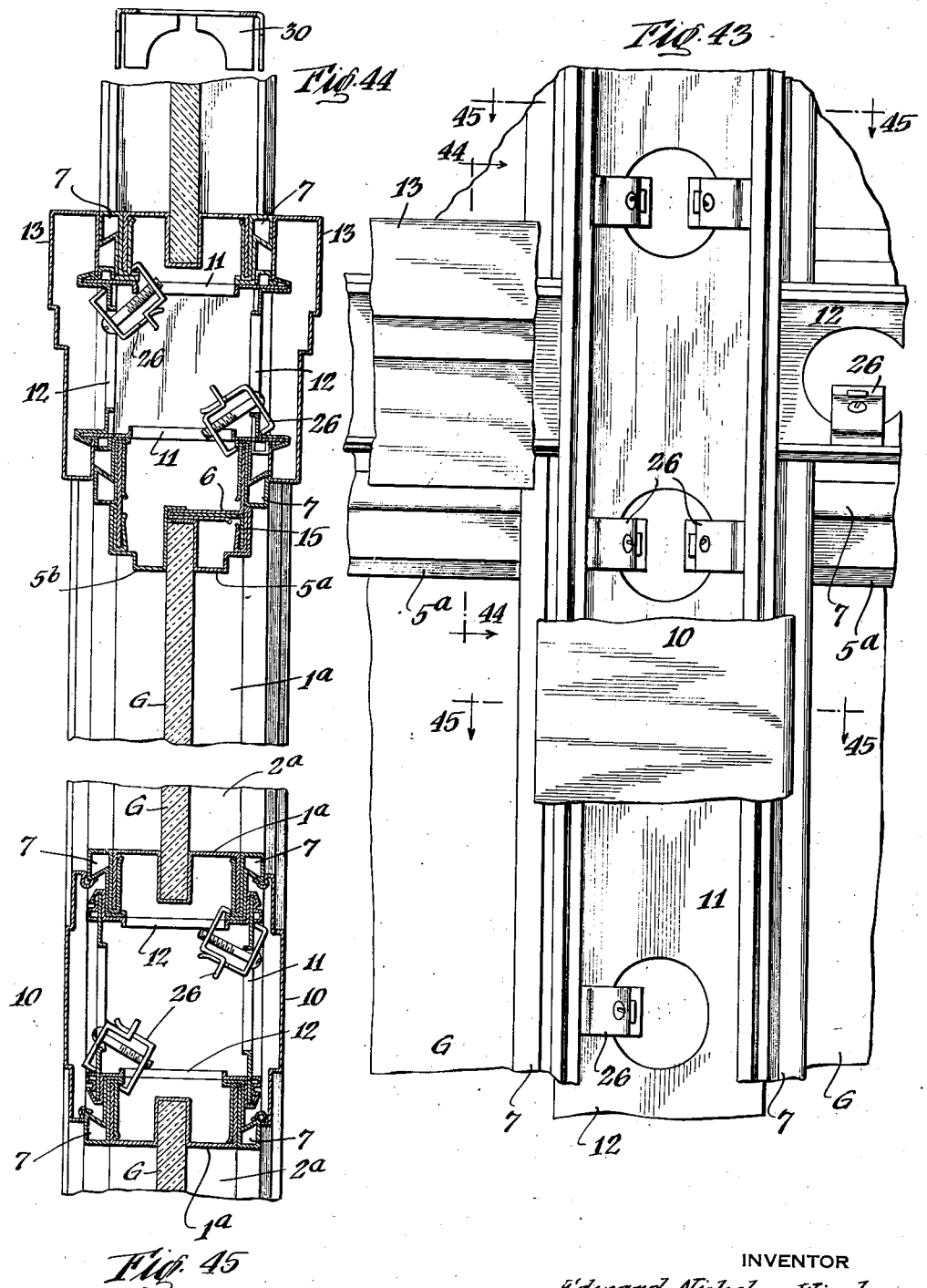

Nov. 2, 1937.  E. N. WINSLOW  2,097,484
STRUCTURAL ASSEMBLY
Filed May 27, 1932    15 Sheets-Sheet 13
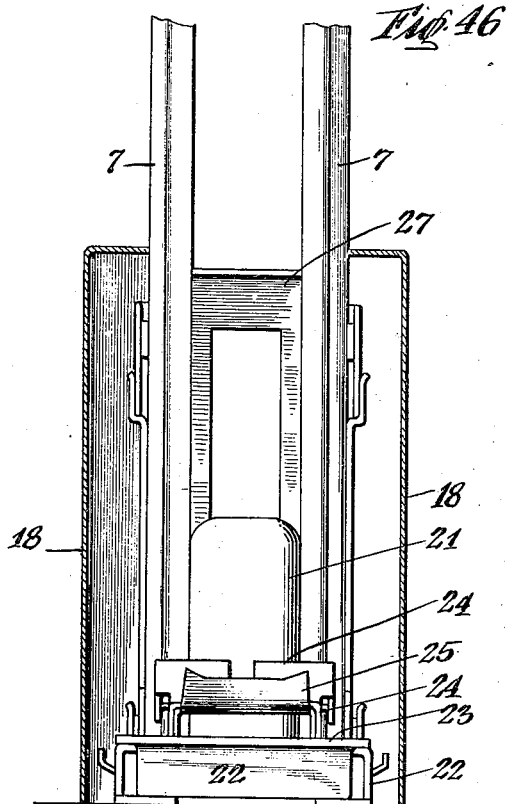
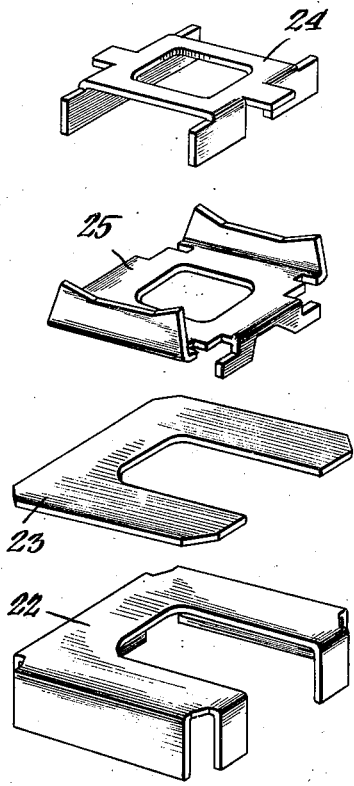
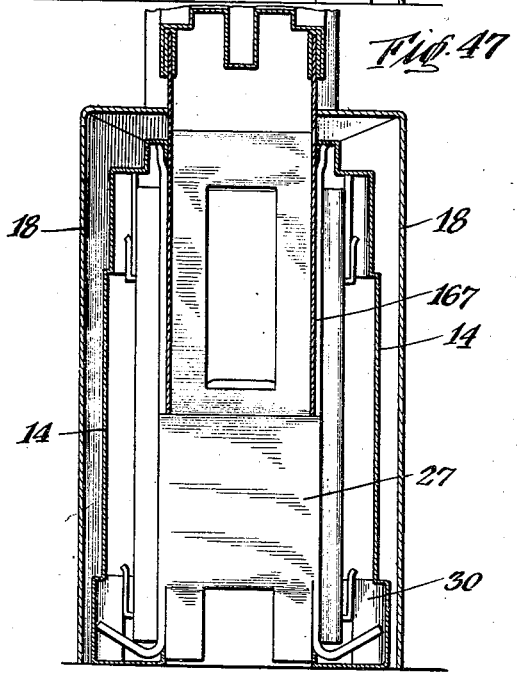
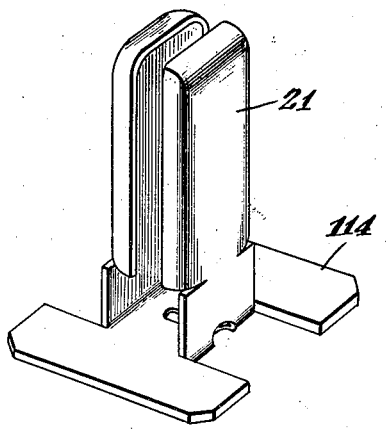
INVENTOR
Edward Nicholas Winslow
BY
ATTORNEYS Nov. 2, 1937.  E. N. WINSLOW  2,097,484
STRUCTURAL ASSEMBLY
Filed May 27, 1932  15 Sheets-Sheet 14
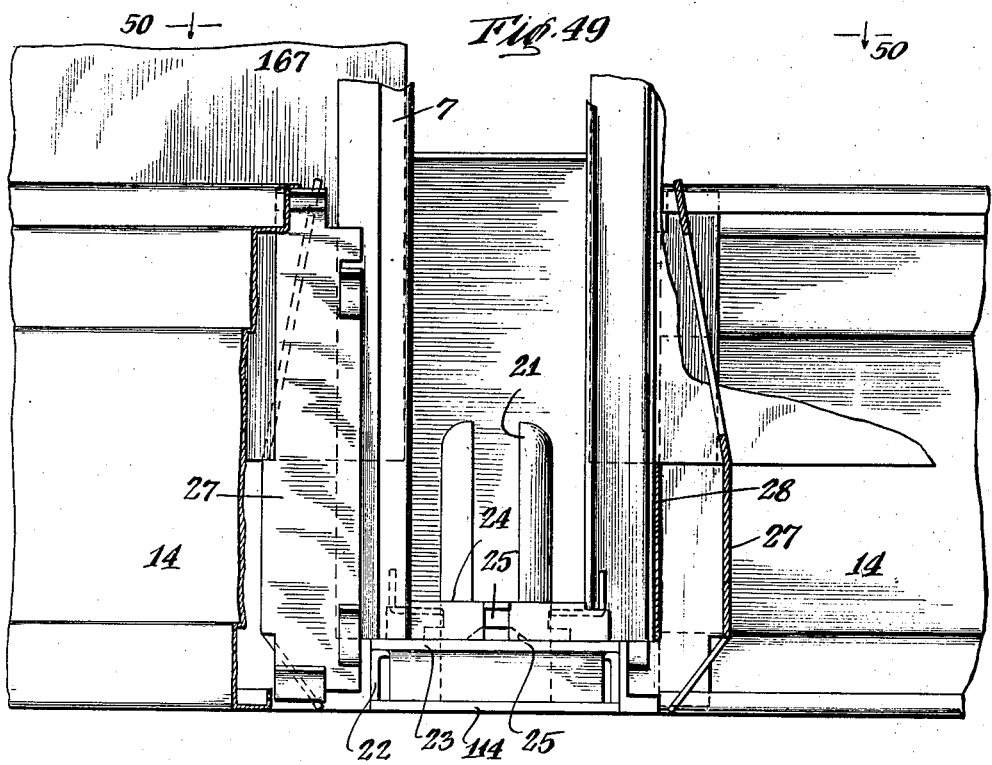
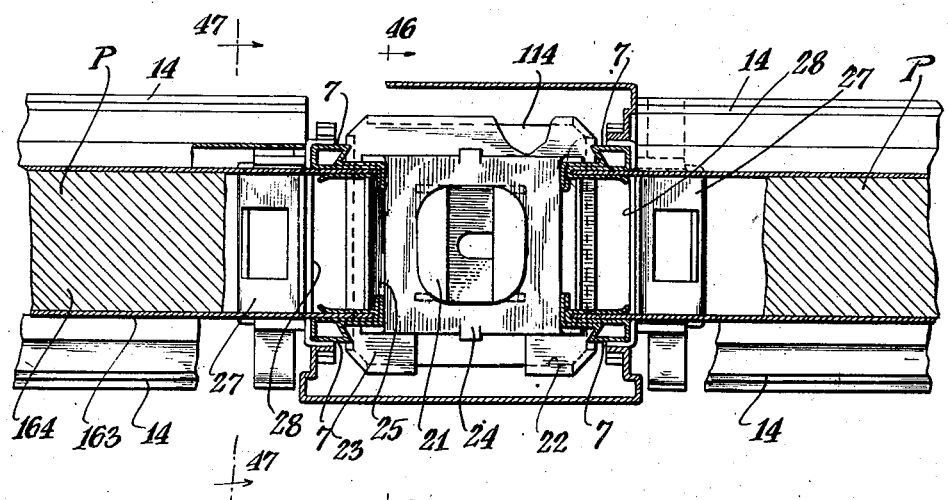
INVENTOR
Edward Nicholas Winslow
BY
ATTORNEYS Nov. 2, 1937.                E. N. WINSLOW                2,097,484
                          STRUCTURAL ASSEMBLY
                          Filed May 27, 1932          15 Sheets-Sheet 15
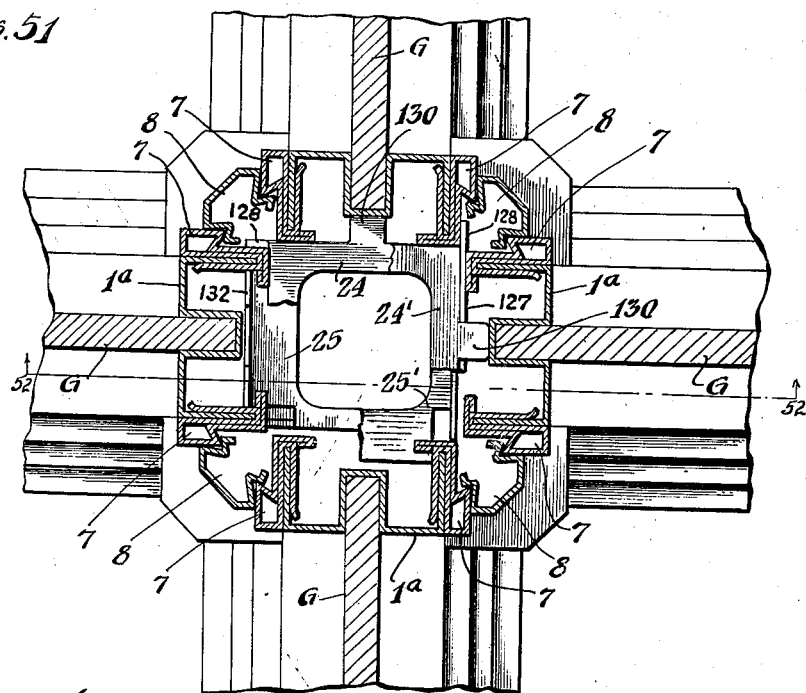
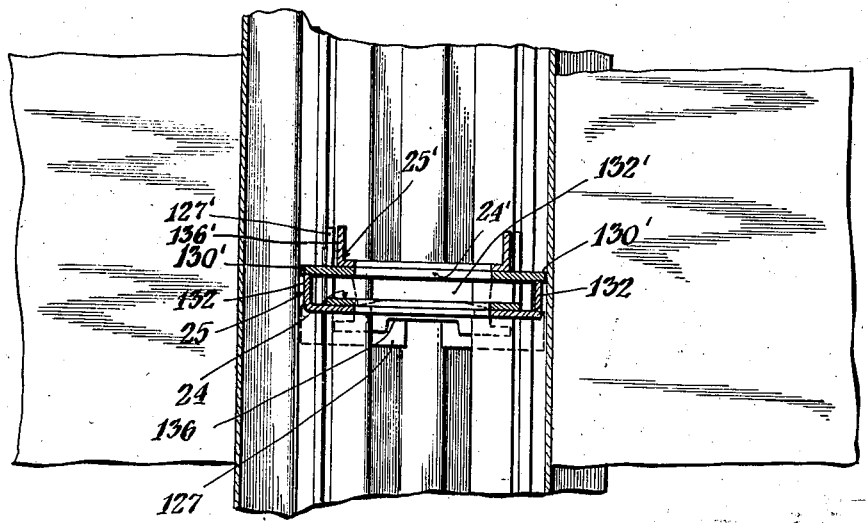
INVENTOR
Edward Nicholas Winslow
BY
Austin & Dix
ATTORNEYS Patented Nov. 2, 1937

2,097,484

UNITED STATES PATENT OFFICE 2,097,484

STRUCTURAL ASSEMBLY

Edward Nicholas Winslow, Shaker Heights, Ohio, assignor to The Mills Company, a corporation of Ohio Application May 27, 1932, Serial No. 613,801

46 Claims. (Cl. 189—34)

This invention relates to a structural assembly and more particularly to an assembly of members adapted to be built up into a variety of partitions, walls, cabinets, structural units and structural frames.

In the construction of interior walls and partitions it is well known that a large variety of wall types and conditions must be satisfied. For example, partitions having panels of various materials in a variety of thicknesses such as single sheet steel, laminated and insulated, and glass in various thicknesses are called for. A complete partition has heretofore been provided to satisfy each requirement, each partition being provided with differently shaped and dimensioned structural members. Again, partitions in many different heights are called for, ranging anywhere from railing-high partitions and standard door frame high partitions, to partitions running up to ceilings of different heights. Partitions having panels of various widths are called for ranging from 20" panels to 60" panels between posts on 5" centers, or in other words, nine different panel widths. It has been estimated that to satisfy these various panel widths and standard panel types and thicknesses alone, approximately 300 different kinds and sizes of steel members must be carried in stock.

This is not all. In ordinary partition installations, T-way conditions, four-way conditions, corner conditions, angular conditions, ends at walls and dead end conditions, all create problems which have heretofore required special members and parts to satisfy. For example, one type of clip has been provided for connecting a two-way or straight run; another type of clip for four-way; another type clip for a three-way; another type clip for a corner, and still another type clip for an end condition, have been provided. In the same way, a special floor connection has been required to satisfy each one of these many conditions. Again, the multiplicity of parts and pieces is repeated in the case of right and left hand plinths, inside and outside corner plinths, baseboards and numerous other forms. A variety of cornice parts have been provided to satisfy the different cornice conditions which arise. Again, this multiplicity of different shapes and sizes of members is repeated in the case of the chair rail, transom bar, top rail, post cap, door frame, wall filler, and numerous other members.

Thus, the parts that must be carried on hand as inventory to satisfy these multi-fold conditions which are constantly occuring, is staggering. Careful checking must be done so that the proper parts are furnished for each condition. Very often, each part must be specially marked. Sometimes these parts become mislaid in the field and then an entire installation is held up until another part can be furnished. Again, mistakes are often made in the engineering department in connection with the checking off and summing up of the proper parts in the proper quantities. Special machinery and special dies must be provided to stamp and form the different parts. In addition to the tremendous inventory which must be carried and the cost of forming the multi-fold parts, the constant checking, the confusion in ordering and shipping, and the difficulty in erection cannot be adequately reckoned and can only be appreciated by the workers in the art.

It is among the objects of my invention to overcome the difficulties above enumerated by providing a simple and flexible structural assembly which can be made from a very few master parts which are so interchangeable that any variety of structural condition may be satisfied.

Another object of my invention is to provide a relatively few structural members and elements which can be variously combined to make a large number of different structures such as partitions, display and storage racks and cabinets, interior and exterior furniture, interior and exterior building trim, buildings and houses.

Another object of my invention is to provide a limited number of structural parts which can be variously combined and interchanged to make a large variety of different types of partitions, cabinets, racks and other structural assemblies, all of which are flexible and interchangeable in three dimensions.

Another object of my invention is to provide a few simple devices adapted to interlock and bind with the various structural parts to firmly and rigidly hold the structural assembly in set-up condition, which securing devices can furthermore be easily disconnected or removed so as to permit the ready disassembly of the structure.

It is another object of my invention to provide as few securing devices as possible to satisfy all structural conditions, and, further, to so devise these select pieces so that they may be made cheaply, economically and in quantities.

Another object of my invention is to provide a novel baseboard and plinth assembly which are firmly held in place and yet which can be easily removed to permit access to the interior of the structure for the insertion of wires and conduits.

Another object of my invention is to provide a flexible and interchangeable post and post cap assembly which is strong and sturdy in construction and which permits ready access to the interior for wiring, insulating and other purposes.

A further object of my invention is to provide a novel cornice or coping assembly which is light in weight, and yet possesses unusual strength to resist strain from all directions, and which has spacious accommodation for the unobstructed passage of conduits therethrough.

Another object of my invention is to provide a novel framing and sectional unit assembly which may be locked together in such a way so as to combine the thrust resisting strength of both.

Another object of my invention is to provide a structural assembly which can be decorated in any variety of color ensembles at substantially no greater cost than would be required to give the structure a single color.

Another object of my invention is to provide a structural assembly which may be made in toto from a number of different metals and bendable materials, or whose parts may be selectively made from different metals and materials to bring out various artistic and decorative effects.

Another object of my invention is to provide a structural assembly which possesses marked beauty of line, whose parts can be given any number of different artistic shapes without affecting its structural efficiency, and without affecting the general economy, ease and facility of production, assembly and erection.

Another object of my invention is to provide a novel method of assembling structural units which requires only a few stock shapes and from which can be made an unusually large number and variety of different types, sizes and shapes of structural units, with a small amount of equipment, with relatively limited floor space, with a minimum checking, marking, tabulation and engineering, and which can be produced on short notice and in large quantities with speed, efficiency and economy.

To attain these desirable ends, I first provide a key member which may be used in pairs to form vertical, as well as horizontal, framing members. For example, this same key member is used in the assembly of all post uprights, whether two-way, three-way, four-way or dead end posts. This same key member is also used in the assembly of some of the horizontal framing members, particularly the framing members abutting the cornice. These key members are adapted to receive panels of various thicknesses. For example, a full packed panel may be secured directly to the key members. If less than a full packed panel is to be provided, such for example, as single sheet steel, glass, or a thin laminated panel, I provide channel members which have a groove to receive any one of these panels. These channel members are attached directly to the key members. Various types of vertical panel receiving channels are formed from a single master rolled section of channel shape. Only the master section need be carried in stock. When an order for a partition or structure is received with a particular thickness of panel specified, the master sections are placed on a brake or other bending machine and the necessary groove quickly formed therein to satisfy the panel condition called for. In this way only two members, the key member and the rolled master, need be kept in stock for all types of post and panel conditions.

Again, only four different types of horizontal master shapes need be kept in stock. From these four master shapes, chair rail members, transom bars, base pieces and cornice parts may be quickly formed, adapted to receive every type of panel. In other words, every kind of horizontal framing condition requiring different type panels are provided for and may be formed from these four master shapes.

I have been able to satisfy all the various types of post cap conditions resulting from two-way, three-way, four-way and dead end conditions by means of two types of post caps only, which may be carried in stock. The cornice is provided with a reinforcing beam of unusual strength built up from two pairs of plates. This cornice beam is designed to also be used for a ceiling post when conditions so require. A cornice cover or a cornice trim piece of one shape only is required to fill all types of cornice conditions.

A door buck member formed from a single piece is carried in stock which will satisfy all door conditions. The door buck member is adapted to fit directly into the key members forming the door posts and also into the horizontal frame member over the door.

In addition to the above members, I provide a single base member shaped to fit on either side of the partition and adapted to satisfy all field conditions. A base member on each side of the partition is used and they are held spaced apart and locked together by a spacer member which is stamped from heavy gauge metal. Only one type of spacer need be used for all partition conditions.

I have provided three plinth blocks which are adapted to satisfy all partition field conditions. One of the plinth blocks satisfies all straight run conditions and may be placed on either side of the partition or at the bottom of the door frame post. The other two types of plinth blocks satisfy inside corner and outside corner conditions respectively. With these three types of plinth blocks, two-way, three-way, four-way, dead end, end wall, and inside corner at door frame conditions are satisfied. In the case of an angular turn, which is more or less than a right angle, no plinths are used.

I have also provided a single floor stud or floor connection which is adapted to fit either a two-way, three-way, four-way, or dead end post condition. In placing this stud member, all that is necessary is to drill holes in the floor at intervals where any partition post is to rest. The floor stud is a stamped member which can be economically made and can be shipped to the job in barrels and secured to the floor at approximately the proper spaced intervals without giving any thought to the two-way, three-way or four-way or end condition which may occur at the post location. This single stud satisfies them all. Furthermore, the stud is shiftable and adjustable so that inaccuracies in drilling the hole in the floor can be compensated for.

Two types of simple and inexpensive shims are provided, one known as a master shim, which is placed upon the floor stud and the third being a thin sheet metal shim adapted to rest on the master shim. These two shims are shaped to satisfy all floor conditions.

The unit sections which comprise my partition are made up at the plant from the master shapes above generally described. When the sections reach the field, they are secured together by means of ties, each tie comprising a pair of cooperating clips. These paired clips engage the key members which form part of the uprights of the unit sections and firmly lock these opposed uprights together in firm assembly. The paired clips may be secured at any location along the uprights. This is a distinct advantage since more paired clips may be added when an unusual strong connection is desired, or when strains in the partition result which require that the sections be pulled together at a particular point. My novel paired clips may be used to secure sections together at either two-way, three-way, or four-way intersections. No special clips, therefore, are necessary. These paired clips are both inexpensively made from a simple stamping and can be shipped in quantities to the location without checking, marking or confusion.

An important feature of my invention is also a novel connection arrangement whereby the cornice and the panel units above and below the cornice are locked together so as to act as one member when subjected to lateral thrusts. Heretofore, the cornice abutting edge of the panel unit has been loosely fitted into a groove provided in the cornice member and the cornice member has, therefore, been required to carry the full force of lateral thrusts without benefit of the stiffness present in the panel units. Spaced clamps are used to secure the cornice reinforcing member to the panel units above and below the cornice. The clamps above described may also be used to secure the post uprights and panels together.

Spacer members formed from a single stamping are positioned between the posts. The baseboards, each of panel length, are snapped into place thereon. The plinth block interlocks the spacer members on opposite sides of the post, and the whole is thus firmly but removably bound together and held in place.

A modified spacer member is used at door openings to hold the door plinths in place. This same member may also be used at dead ends. The end of the beam member is held abutted and fixed to the wall or ceiling, as the case may be by a simple block shaped stamping.

The use of bolts, nuts, screws, or welding of any kind to secure the various parts together as an assembled structure, have been eliminated. Approximately nine simple and inexpensive stampings, which variously function to interlock with the structural parts of the assembly, hold the structure sturdily and strongly together. A great saving in labor in both production and erection is thus effected.

It is thus seen that only approximately nine securing pieces are required to bind all parts of the partition together and to satisfy the various conditions which may arise, and all of these pieces can be cheaply made. For this reason, each of these pieces may be shipped to the location in boxes or barrels and in quantities without checking, marking, blueprinting or detailing, as has heretofore been necessary for each special condition.

The structural parts herein disclosed lend themselves to decoration and painting in infinite variety, and at no substantially additional cost. For example, the snap-on post caps, cornice facings and baseboards are all separable parts which may be painted before assembly in different colors so as to harmonize with the building interior or with any artistic color scheme. Furthermore, the chair rail and transom bar are formed from separable parts which may be painted before they are assembled together, and they also may be painted such colors as will bring out color contrast or color harmony as desired. Furthermore, the packed, single sheet, and laminated panels, as well as the vertical and horizontal framing members, may also be painted the same or different colors before assembly so as to bring out the desired color scheme. It is thus seen that the structure may be given any variety of color ensembles by simply painting the various parts before final assembly, which can be done at a little, if any, additional cost. The various parts which make up the structure may also be made of different metals, for example, steel, brass, copper, Monel metal, aluminum, or highly polished nickel as desired. Further color contrast and beauty of line can thus be brought out.

While for purposes of illustration the structural assembly herein disclosed will be described in connection with interior partitions, it is understood that the different parts can be advantageously incorporated in a large variety of structures and devices. By way of example, display cabinets and display racks in a variety of designs and patterns may be built from these structural members to house or contain the merchandise and articles for display in stores, as well as for display in the open, in which case the structure may be more sturdily constructed to resist the weather. Racks and cabinets made from these structural parts are also useful in warehouses and storage plants where it is advantageous to have merchandise conveniently and orderly arranged. In addition to partitions, display cabinets and merchandise racks, the structural members herein disclosed may be variously combined to form articles of furniture for exterior and interior use, such as bookcases, parcel racks, book racks, hat racks, and exterior and interior trim for buildings. Houses and buildings, especially of the knockdown type, may also be economically and efficiently made from the parts herein disclosed.

It is understood that the structural elements herein disclosed can be made from any desirable metal, such as steel, nickel, aluminum, brass, or copper, or from various alloys of these metals. The selection of the metal would, of course, depend upon the use to which the structural parts are to be put.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which—

Fig. 1 is a perspective view of my partition showing by way of illustration, various panels, such as the packed panel, sheet steel panel, glass panel and thin laminated panel, all in assembled position;

Fig. 2 is a perspective view of the partition, certain parts thereof being shown in cross section to illustrate more particularly the interchangeability of the parts;

Fig. 3 is an end view in perspective of a master section from which various framing members may be formed;

Fig. 3A is an end view in perspective of a member formed from the master section shown in Fig. 3;

Fig. 3B is an end view in perspective of another member formed from the master section shown in Fig. 3;

Fig. 4 is an end view in perspective of a master section from which a number of framing members are formed;

Fig. 4A is an end view in perspective of a member formed from the master section shown in Fig. 4;

Fig. 4B is an end view in perspective of another member formed from the master section shown in Fig. 4;

Fig. 4C is an end view in perspective of still another member formed from the master section shown in Fig. 4;

Fig. 5 is an end view in perspective of a master section from which further members may be formed;

Fig. 5A shows a member formed from the master section shown in Fig. 5;

Fig. 5B shows another framing member formed from the master section shown in Fig. 5;

Fig. 5C is an end view in perspective of a stop member formed from the master section shown in Fig. 5;

Fig. 6 is an end view in perspective of a master section from which a plurality of moldings may be formed;

Fig. 6A is an end view in perspective of a removable molding formed from the master section shown in Fig. 6;

Fig. 6B is an end view in perspective of a fixed molding complementary to the molding shown in Fig. 6A, and also formed from the master section shown in Fig. 6;

Fig. 6C is an end view in perspective of a half rail formed from the master section shown in Figure 6, this member being used in special constructions;

Fig. 7 is an end view in perspective of a rolled section used as a framing member;

Fig. 8 is an end view in perspective of an angular member used to retain the removable molding in place;

Fig. 9 is an end view of a simple channel member which is used to hold the key member spaced apart;

Fig. 10 is an end view in perspective of a key member used to form post members and certain horizontal framing members;

Fig. 11 is an end view in perspective of a snap-on post cap used at partition corners;

Fig. 12 is an end view in perspective of a snap-on post cap used on straight partition runs;

Fig. 13 is an end view in perspective of a post molding adapted to snap on the inside corner of a two-way, three-way and four-way post; this same piece also being used for the outside corner of a two-way post as a structural member;

Fig. 14 is an end view in perspective of a stamped plate which forms a part of a reinforcing beam;

Fig. 15 is an end view in perspective of another plate of different shape which interlocks with a pair of stamped plates, such as shown in Figure 13, to form the reinforcing beam;

Fig. 16 is an end view in perspective of the cornice facing member adapted to be snapped on to the reinforcing beam;

Fig. 17 is an end view in perspective of the baseboard which is applied to the bottom of the partition;

Fig. 18 is an end view in perspective of the door frame member;

Fig. 19 shows an angular member which cooperates with the member shown in Figure 8 to removably secure the removable molding member, shown in Figure 6A, in place;

Fig. 20 is an end view in perspective of the structural member from which the transom frame is formed;

Fig. 24 is a perspective view of the floor stud, which secures the structure to the floor;

Fig. 25 is a perspective view of the master shim which telescopes around and rests on the floor stud;

Fig. 26 is a perspective view of a simple shim which telescopes around the floor stud and rests upon the master shim;

Fig. 27 is a perspective view of the male clip used in compression to connect various sectional units together;

Fig. 28 is a perspective view of the female clip used in tension which cooperates with the male clip shown in Figure 26 to connect the sectional units together;

Fig. 29 is a perspective view of the clamp variously used to connect the reinforcing beam and the adjacent panel units together in rigid assembly;

Fig. 30 is a perspective view of the spacer which operates to removably connect and hold the baseboards on opposite sides of the partition in assembled position and also operates to removably hold the plinths on opposite sides of the partition in assembled position;

Fig. 33 is a horizontal cross sectional view taken through a straight run post showing various panel types exploded therefrom, all of which can be interchangeably applied thereto;

Fig. 34 is a horizontal cross sectional view through the partition showing particularly a three-way post with various interchangeable panel types exploded therefrom;

Fig. 35 is a horizontal cross sectional view showing more particularly the method of fastening the door frame member to the post;

Fig. 36 is a horizontal cross sectional view through the partition, showing more particularly the dead end construction;

Fig. 37 is a horizontal cross sectional view through the partition showing the construction at an obtuse bend;

Fig. 38 is a horizontal cross sectional view through the partition showing more particularly the four-way post construction with various interchangeable panel types exploded therefrom;

Fig. 39 is a horizontal cross sectional view through the partition showing more particularly a two-way post construction with various interchangeable panel types exploded therefrom;

Fig. 40 is a vertical cross sectional view taken through the cornice showing particularly the various panel types which may be interchangeably connected to the cornice along the top and along the bottom thereof;

Fig. 41 is a vertical cross sectional view through the chair rail showing various interchangeable panel types exploded therefrom;

Fig. 42 is a vertical cross sectional view through the transom bar showing various interchangeable panel types exploded therefrom;

Fig. 43 is a fragmentary elevational view of the partition taken at the post and cornice intersection, showing particularly the cornice and panel unit connection, the means used for reinforcing and strengthening the posts and that part of the partition which extends above the cornice;

Fig. 44 is a vertical cross sectional view through the cornice, this view being taken on line 44—44 of Fig. 43;

Fig. 45 is a horizontal cross sectional view through the post shown in Figure 43, this view being taken on line 45—45 of Figure 43 drawn either above or below the cornice as shown;

Fig. 46 is a vertical cross sectional view through the lower end of the partition post, this view being taken on line 46—46 of Figure 50;

Fig. 47 is a vertical cross sectional view through the lower end of a partition post, this view being taken on line 47—47 of Figure 50;

Fig. 48 is an exploded view of the various devices for securing the sectional units together at the floor;

Fig. 49 is an elevational view of the lower end of a partition post, certain parts being broken away to illustrate the interior construction;

Fig. 50 is a horizontal cross sectional view through the lower end of the partition post, this view being taken on line 50—50 of Figure 49;

Fig. 51 is a fragmentary, horizontal sectional view showing a four-way post, and Fig. 52 is a fragmentary view showing a vertical section taken along line 52—52 of Fig. 51.

Similar reference characters refer to similar parts throughout the several views of the drawings.

Figure 22:
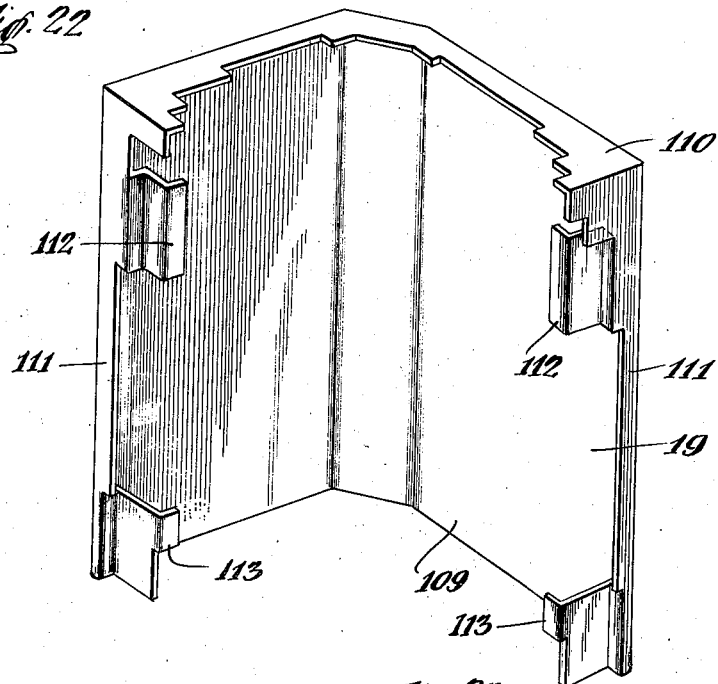
Fig. 22 is a perspective view of the plinth block which is applied to the outside corner of a two-way post.

Having now generally described the main features of my invention, the various parts thereof will be described more in detail. For purposes of illustration, these various parts will be described more particularly in relation to an interchangeable partition structure, although it is understood that these parts can be variously and interchangeably combined to form a number of different structures, and/or types of such structures.

*Master sections*

To reduce the number of different parts which must be carried in stock, and to still provide for the various types of partitions which are constantly called for, I provide a few master sections which may be carried in stock and from which many other types of framing members may be formed.

Referring more particularly to Fig. 3 of the drawings, I have shown a master section 1, from which all vertical panel receiving members are formed. Master section 1 is carried in stock at all times, either in a number of different lengths or in one length as found convenient. This master section is a simple channel comprising a web portion 31 and flange portions 32, and may be rolled to the proper shape.

From the master section 1 is formed a variety of panel receiving vertical members. By way of example, I have shown in Fig. 3A a vertical member 1a having a groove 33 formed in the web portion 31 thereof, which is adapted to receive a thin laminated panel, glass plate, or other panel forming material constituting a panel stretcher. In Fig. 3B I have shown a vertical panel receiving frame member 1b having a relatively narrow panel receiving groove 34 formed on the web portion 31, adapted to receive a sheet metal panel, or the like.

Each of the flange portions 32 of the vertical framing members 1a and 1b are adapted to be locked to a key member 7, shown more particularly in Fig. 10, which will be further described hereinafter. It will be noted that the flange portions 32 of vertical members 1a and 1b are, in each instance, the same distance apart, since panel receiving grooves 33 and 34 are of the same depth. Vertical members 1a and 1b can both be quickly formed on a brake or other metal bending machine from the master section 1. The groove therein may be made to accommodate any type or any thickness of panel.

I have shown, in Fig. 4, a horizontal master section 2 from which the horizontal frame members 2a, 2b and 2c, shown in Figs. 4A, 4B and 4C, respectively, may be formed. The master section 2 may be a rolled section and comprises generally a web portion 35 and flange portions 36. The corner portions 37 may be formed into any desired artistic design without interfering with the interchangeability and structural features herein described.

Horizontal member 2a is provided with a relatively wide panel receiving groove 38, which is adapted to receive a panel of thick glass or laminated sheet material, as desired. Horizontal member 2b is provided with a relatively narrow panel receiving groove 39, and the horizontal member 2c is provided with an abutment portion 40 40 extending upwardly from the web portion 35. The abutment 40 is adapted to serve as a stop for a hinged transom and the like. The grooves 38 and 39 and the abutment 40 are the same in depth. The flange portions 36 of each of the horizontal members 2a, 2b and 2c are, therefore, spaced exactly the same distance apart and can be used interchangeably. The horizontal members 2a, 2b and 2c may be used to form a part of the framing which abuts the cornice above and below the same. When so used, each of the flange portions 36 of the member selected is connected to a key member 7 shown more particularly in Fig. 2 and Fig. 40. These three members may be formed on a brake or other bending machine from the master section 2.

A third master section 3 is shown in Fig. 5. This master section is used to form a number of horizontal framing members, particularly the chair rail, transom bar and the upper portion of the base molding. This master section comprises a web portion 41, exterior flange portions 42, upturned portions 43 and downturned flange portions 44. The downturned flange portions 44 are spaced from the upturned portions 43 so as to permit the insertion of a metal sheet therebetween. The downturned flange portions 44 are also sprung downwardly so as to grip the metal sheet when it is inserted. To facilitate insertion of the metal sheet, the ends 45 of the interior flanges 44 are turned inwardly, as clearly shown in Fig. 5. This master section is kept in stock in any convenient length or lengths desired.

When a partition having glass or thin laminated panels is called for, the required horizontal member 3a is formed by placing the master section 3 on the brakes and forming the groove 47 therein, as shown in Fig. 5A. Or again, if a single steel sheet panel is desired, the required horizontal framing member 3b is provided by forming narrow panel receiving groove 48 in the web portion 41 of the master section 3. The stop member 3C has the web portion 41 thereof bent outwardly to provide a stop portion 190. The horizontal framing members 3a, 3b and 3c are of the same width and can be used interchangeably. The corners 46 of the master section 3 may be formed into any desired decorative configuration.

I have shown in Figure 7 another horizontal framing member 4 which is used when packed panels are to be provided both above and below the framing member. Horizontal member 4 may be a rolled steel section and comprises a web portion 49, downturned flange portions 50, and upturned portions 51, which are spaced from the downturned flanges 50 so as to provide room for a steel sheet therebetween. The upturned portions 51 make a return bend at the top so as to provide the trim portions 52, which are correspondingly upturned at their lower edges to provide the upturned portions 53, and finally, the downturned flanges 54. The downturned flanges 54 are also spaced from the upturned portions 53 to make room for a metal sheet therebetween.

The trim portion 52 corresponds in all respects with the trim portion 42 of the horizontal members 3a and 3b, so that uniformity of design is accomplished throughout the partition. The shape of these trim portions may, of course, be varied as desired. Also, the flanges 54 of the horizontal member 4 are spaced the same distance apart as the downturned flanges 44 of the horizontal members 3a and 3b and they therefore may be used interchangeably, as shown by way of example in Figure 41.

From the master section 5, shown in Fig. 6, I form moldings 5a and 5b, shown in Figs. 6A and 6B, respectively. The master section 5 comprises the web forming portion 55, the downwardly extending trim portion 56, an upwardly extending portion 57 and a downwardly extending flange portion 58, spaced from the upturned portion 57 to permit the insertion of a metal sheet therebetween. The corner portion 59 may be shouldered as shown. The master section 5 is carried in stock in any convenient length.

The molding 5a may be formed from the section 5 on a brake by bending the web forming portion 55 downwardly to form the glass abutment portion 60 and outwardly to form the seat portion 61, to receive the edge of the panel. The molding 5b is similarly formed by bending down the web forming portion 55 so as to provide the abutment portion 62 and the lip portion 63, which extends under the seat portion 61 when the members 5a and 5b are arranged in assembled position.

The molding 5a is removable so as to permit the insertion and replacement of panels and particularly glass panels where desired. The assembly of the moldings 5a and 5b is shown more particularly in Figs. 41 and 42.

To removably secure the molding 5a in assembled position I have provided an angular section 6, shown in Fig. 8. This section may be a rolled shape. The angular section 6 comprises flange portion 64, and flange portion 65 extending at right angles thereto, and a rebent flange portion 66, which is spaced from flange portion 65 sufficiently to permit the insertion of flange portion 67 of another angular member 15, shown in Figure 19.

The simple angular member 15 has a flange portion 68 extending at right angles from the flange portion 67. The assembly of these parts is made clear by referring to Figures 41 and 42 of the drawings.

A simple channel member 28 is shown in Figure 9 which, in partition construction, has special uses. The flanges thereof are spaced the same distance apart as the flanges of the other framing members, so as to fit into the key members 7. A short length of the channel member 28 is used at the top and bottom of each post to hold the key members 7 in proper spaced alignment, as shown in Figures 49 and 50, and is also used at dead ends, as shown in Figure 36.

While the structural members shown in Figures 3 to 9, inclusive, and the parts formed therefrom have been variously referred to as vertical and horizontal members, it is understood that they may be used in any position or location where a framing member is desired. By simply changing the depth of the panel groove in these various members the wall of the structure can be given any desired thickness. If an unusually thick wall is desired, a pair of framing members 5C, formed from master moulding 5, may be used, with a spacing member positioned therebetween. Member 5C is formed by bending the end of the web forming portion 55 of the master section 5 to provide an engaging flange 60. Or a wall trim or wainscoting may be provided by using half members such as member 5C.

Structural key members

I have shown in Figure 10 a key member 7 which forms a very important part of my flexible and interchangeable assembly, and which comes into use many times. A considerable supply of key members 7 should be carried in stock in one or more convenient lengths. The key member 7 may be generally described as a tubing made from a single sheet which is crimped and locked together in such a way as to provide a member of unusual strength. The key member comprises facing portions 69 and 70 which are visible when the structural assembly has been erected and, in addition to adding great strength, provides a decorative bead which considerably enhances the appearance of the assembly.

A wall portion 71 extends from the facing portion 70 and terminates in a flange portion 72, which is spaced from portion 71 to permit the insertion of a metal sheet therebetween. The free edge 73 of the flange portion 72 may be rounded off to facilitate insertion of the metal sheet. A shoulder portion 74 forms an acute angle with the facing portion 69 for a purpose hereafter to be described. A wall portion 75 extends from the shoulder portions 74, closely hugs the wall portion 71, and terminates in a return lip portion 76, which grips and locks with the connected end of the lower end of wall portion 72, in such a way as to form, in effect, an interlocked seam, similar to the interlocked seam of the well known seamed tubing.

From a comparatively narrow gauge metal sheet, I have thus been able to produce a structural member of unusual strength and rigidity. The key member 7 forms a part of every straightway, two-way, three-way, four-way and dead end post, as shown in Figures 33 to 39, inclusive. In addition, the key member 7 forms a part of the horizontal framing members which abut the cornice, shown more particularly in Figures 40 and 44.

Flexible and interchangeable post cap members

A snap-on post cap 10 is provided, shown in Figure 12, which is adapted to be applied to all straight partition runs. Post cap 10 comprises a facing portion 77 and return bend clip portions 78. The post cap snaps into place by forcing the clip portions 78 into resilient engagement with the shoulder portions 74 of spaced key members 7, which form part of the vertical frames of adjacent sectional units. The cooperative arrangement between the snap-on post cap 10 and the key members 7 is made clear by referring to Figure 33. The post cap is carried in stock in one or more convenient lengths and serves as a post cap for all straight run posts, dead end posts and door posts of every description. The facing portion 77 may be provided with trim portions 80 to give the partition post an artistic and finished effect. It is understood, however, that the facing portion 77 may be given any artistic shape desired without departing from the inventive concept herein disclosed.

I have shown in Figure 11 a post cap 9 which is used when a corner condition arises, such as is shown in Figure 39. One edge of the post cap 9 is, in every respect, similar to the edges of the post cap 10. The other edge of post cap 9 is cut short and is provided with an outwardly flared flange portion 81. The clip portion 78 of the post cap 9 snaps into resilient engagement with the shoulder portion 74 of the adjacent key member 7, and the flared flange portion 81 resiliently engages the groove 83 provided in a post molding 8 which is shown in Figure 13.

The post molding 8 is positioned at both the inner and the outer corners of all two-way, three-way and four-way posts, as clearly shown in Figures, 34, 38 and 39. The exposed face portion 82 of the molding member (see Fig. 9) is given an artistic shape to harmonize with the general design, and while the facing portion is shown as three sided in shape, any variety of shapes may be given to the facing portion without effecting the cooperative interchangeability. Molding member 8 may be rolled from a single metal sheet and a pair of primary grooves 83 provided along the sides thereof, which run the full length of a molding. A pair of secondary grooves 84, running parallel with the primary grooves 83, may also be provided. The primary grooves engage the shoulder portions of the key members on all inside corners. The edges of the molding are lapped over and crimped to provide a strong lip 85. The lip 85 provides a projection, similar to projection 76 of key member 7, with which the post securing clips engage at the outside corner of a two-way post, as shown in Figure 39. In this position the molding 8 forms a strong and rigid supporting upright which adds materially to the strength of the corner construction. The molding member 8 may be carried in stock in one or more convenient lengths.

Cornice construction

In locations where unusual strength is required, a built-up beam is provided which is formed from a pair of stamped plates 11 and a pair of stamped plates 12, shown in Figs. 14 and 15. The plate 11 may be made of any desired gauge and is provided with spaced apertures having a flange portion 86 extending around each aperture, which stiffen and strengthen the member. The flanged apertures are progressively formed in the metal by running the plate 11 through a stamping machine. The plate 12 is shaped as shown in Fig. 15, and comprises a web portion 87 and out-turned flange portions 88. The out-turned flange portions are rebent to provide a pair of parallel beads 89 and 91 on the outside face thereof which present a narrow groove 90 extending therebetween. The groove 90 is of sufficient width to receive a single metal sheet. The purpose of this groove will appear hereinafter.

Each of the lips 92 of plate 12 is rebent inwardly so as to interlock and grip an edge of the spaced plates 11 inserted between the lip 92 and the flange portion 88, as shown in Fig. 40. The plate member 12 is run through a punch press forming spaced apertures therein, surrounded by a reinforcing flange 93. The panel plate members 11 and 12 are run through a crimping machine which interlocks the edges of the plates together. An unusually strong and rigid beam is thus economically formed which is especially resistant to thrusts directed laterally against the plate member 12. This novel interlocking construction may be compared to a four seamed interlocked tube, and permits the use of relatively thin gauged sheet metal. The desirable characteristics of lightness and great strength is thus realized. The beam thus constructed may be advantageously used in the cornice assembly as shown in Fig. 40, as well as in the post assemblies as shown in Figs. 43 and 45, particularly where the partition is unusually high or where partitions of unusual strength are desired. This beam, formed from the plates 11 and 12 as above described, may be kept in stock in any convenient length.

To give the cornice a finished appearance, facing members 13, as shown in Fig. 16, are provided. The facing member 13 comprises a facing portion 94, which may be given any desired contour or configuration which will harmonize with the general assembly. The cornice facing member 13 is provided with an upturned lip portion 95 and a downturned lip portion 96, both which are adapted to snap over the beads 89 and seat within the longitudinally extending grooves 90 of the spaced plate members 12, as clearly shown in Fig. 44. Only one type of cornice facing member 13 is kept in stock to satisfy all cornice conditions.

I have shown in Fig. 18 a door frame 16 of channel form, comprising a web portion 97 and flange portions 98, which may have bead portions 99 struck out therefrom to decorate the member. The web portion 97 of the door buck is out-turned to provide a door striking portion 100. The general assembly is so designed that door bucks 16 of the same size and form may be connected to the door posts and the horizontal framing member above the door.

Where transom windows and panels are desired, a frame member 17 rolled from a single piece of metal, in the shape shown in Fig. 20, may be provided.

Baseboards and plinths

A baseboard 14, shown in Fig. 17, is provided comprising the facing portion 101 having the desired artistic configuration, the upturned lip 102 and the downturned lip 103. Only one type of baseboard is kept in stock to satisfy all the different conditions which may arise. The baseboard 14 is removably held in position by means of one or more spacer blocks 27, which will hereafter be described.

Figure 21:
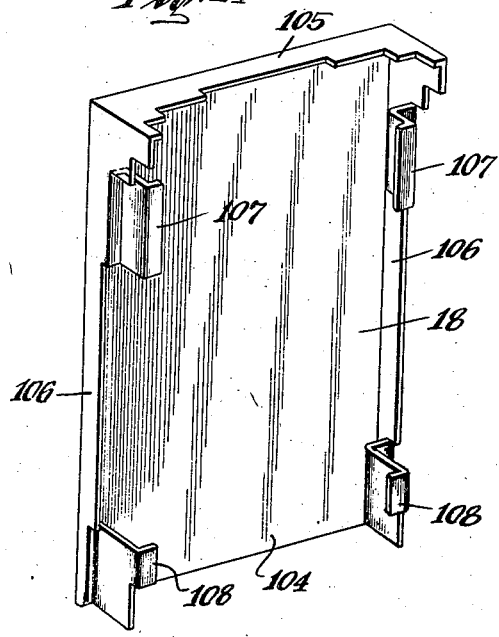
Fig. 21 is a perspective view of the plinth block which may be applied to either side of a straight run post, the straight side of a three-way post, either side of an end post, or at any side of a door jamb post.
Figure 23:
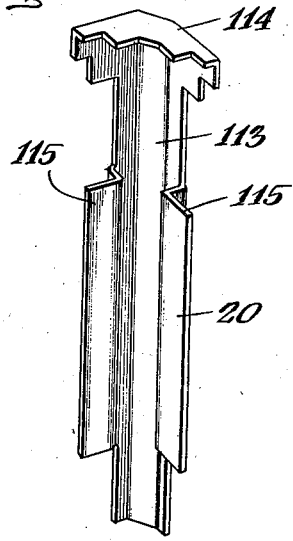
Fig. 23 is a perspective view of the plinth block which is applied to the inside corner of a two-way post, and to the inside corners of a three-way and four-way post.

All plinth conditions are satisfied by three plinth blocks only, as shown in Figs. 21, 22 and 23. The plinth blocks 18, shown in Fig. 21 is removably secured to a pair of spacer members 27 at the bottom of a post along straight runs of partition. This plinth block is stamped from a single piece of metal and comprises a facing portion 104, a top wall portion 105 and side wall portions 106. The top wall portion 105 is cut to conform to the shape of the post cap around which it fits, and the side wall portions 106 are similarly formed to closely fit the contour of the baseboards 14. A pair of upper clip portions 107 and a pair of lower clip portions 108 are struck out from the side wall portions 106 of the plinth. The particular manner of securing the plinth to the spacer member will be hereinafter described.

The corner plinth 19 shown in Figure 22 is generally of right angled configuration and is adapted to cover and surround the bottom portion of a two-way post. The corner plinth 19 comprises a facing portion 109 which may be stamped to any desired decorative design. The top wall portion 110 of the corner plinth is cut out to closely fit the contour of the post caps 9 and the post molding 8, as shown in Figure 39. The side wall portions 111 are contoured to fit the baseboards 14 and are provided with upper clip portions 112 and lower clip portions 113, struck out therefrom. These clip portions are adapted to removably engage the spacer members 27 in a manner more particularly described hereinafter.

Figure 23 shows the third type of plinth block 20, which is adapted to fit the inside corners of a two-way, a three-way and a four-way post, as shown more particularly in Figures 34, 38 and 39. This member comprises the angular facing portion 113, and the top wall portion 114, which is cut out to fit the contour of the post molding 8 and the adjacent key members 7. Flange portions 115 are struck out from the facing portion 113, and are adapted to removably engage with the ends of the baseboards, as will be hereafter described.

The three plinth blocks 18, 19 and 20 satisfy all plinth conditions. They are simple in design and inexpensive to make and can be quickly attached or removed by a slight downward or upward manipulation thereof. Access to the interior of the post and base portions of the structure can thus be had at any time.

*Securing devices*

The entire structure assembly is held together by relatively few simple securing devices, shown in Figs. 24 to 32, inclusive.

The structure is anchored to the floor by means of a floor stud 21, formed from a single stamping of sheet metal into the shape shown in Fig. 24. The floor stud comprises a floor contacting plate portion 114 having a pair of wall portions 115 cut out therefrom and bent upwardly. Spindle portions 116 are formed integrally with wall portions 115 and extend upwardly therefrom. The top 117 and the sides 118 of the spindle portions are given a rounded contour as is clearly shown in Fig. 24 by severing the metal, as at 119, and bending the side and top edges of the spindle portions 116 into the desired form. The rounded contour of the spindle portions facilitates the telescoping of the post securing clips thereover, as will be described more in detail hereinafter. The plate portion 114 is provided with a key slot 120, located between the wall portions 115. A floor screw is inserted through the key slot 120 and is screwed to the floor. The key slot 120 permits a certain amount of shifting of the floor stud with reference to the floor, permitting the floor stud to be located to accommodate the post position. This floor stud can be very economically made, and since it can be used in connection with any type of post, these studs can be shipped to the place of installation without checking or detailing, and can be secured to the floor at approximately the correct location without any thought being given to the type of post which is to be positioned thereover.

I have shown in Figure 25 a master shim 22, which is generally horseshoe shaped, and is adapted to be telescoped laterally across the stud 21 so as to rest upon the plate portion 114 thereof. The master shim 22 comprises generally a top wall portion 121, side and rear wall portions 122, and a front wall portion 123. The top wall portion 121 and the front wall portion 123 are provided with a horseshoe cutout 124 which permits the master shim to be removed and telescoped laterally into position with respect to the stud. The master shim 22 may be stamped from a single piece of sheet metal and may be cut out as the corners, as shown in Figure 25, to facilitate the bending and shaping thereof. The removal of the master shim permits the disassembly of the partition for alterations and changes, by simply driving the same out of position, which permits the partition structure to drop down.

To shim up the partition the desired height, I provide a simple shim 23 which may be placed upon the master shim 22 in any desired numbers. The simple shim 23 comprises a rectangular piece of sheet metal having a horseshoe cut out 125 therein. The shim 23 can be made up in quantities from waste sheet material which is found around the factory.

In Figures 27 and 28 I have shown a pair of cooperating male and female clips 24 and 25, respectively, used to secure the sectional units into assembled position. The male clip 24 comprises a top wall portion 126 and side flange portions 127 along the two sides thereof. Each of the flange portions 127 is provided with a retaining lug 128 at each end thereof. Retaining lugs 128 are adapted to engage the outside face of the key members 7 to hold the keyed members 7 of each sectional unit from spreading apart. To permit conduits and wiring to be run through the post, an aperture 129 is provided in the top wall portion 126 of the clip as clearly shown in Figure 33. Lug portions 130 are struck out from the flange portion 127 and closely nest between the flanges 132 of the first clip 25 to hold the clips cooperatively assembled together when four clips are used as in two-way, three-way and four-way posts.

The female clip member 25 comprises a bottom wall portion 131 and upstanding flange portions 132 positioned on opposite sides thereof. A notch 133 is cut near each corner of the plate portion 131 and is arranged to receive the inturned flange portion 75 of the spaced key member 7, as shown for example in Figure 37, or the lip portion 85 of the post molding 8, as shown in Figure 39. When the male clip member 24 is positioned adjacent to the female clip member 25 in the manner more described below, the four spaced key members are securely locked together in rigid assembly. The flange portions 132 give strength to the female clip 25. Downturned flange portions 136 may also be provided with outwardly extending lug portions 137 which come into play in connection with the crating of the sectional units.

When a two-way, three-way, or four-way post condition arises, the units may best be secured together (as shown in Figs. 51 and 52) by first attaching a female clip 25, then telescoping a male clip 24 thereover, then attaching a second male clip 24' back to back with the first male clip 24, and finally attaching a second female clip 25' over the secured male clip 24'. The whole group of clips 25, 24, 24', 25' is pressed together so that the lugs 130, 130' of the male clips 24, 24' engage, respectively, the flanges 132', 132 of the female clips 25', 25.

The reinforcing beam used in the cornice and ceiling post construction may be securely locked to the adjacent framing members by means of a clamp 26, shown in Figure 29. This clamp comprises a pair of complementary male and female elements. Each of these elements comprises a body portion 138, and a cooperating jaw portion 139 at one end. The female element is provided with a flange portion 140 having a slot cut therein. A lug portion 141 extends from the male element and projects into the slot of the female element, thus holding the elements in alignment when the jaw portions 139 are drawn into clamping engagement. A threaded screw 142 which extends through a free aperture in one element and through a threaded aperture in the other element is provided. A screw driver or other tool may be used to manipulate the screw and to clamp the parts which are to be secured together, as is made clear by referring to Figures 43 to 45, inclusive.

The baseboards 14 and the plinth blocks 18, 19 and 20 are held in assembled position by means of a spacer member 27 shown in detail in Figure 30. A spacer member may be positioned on each side of the post between the baseboards 14. The spacer member comprises generally a body portion 143 having flange portions 144 extending laterally therefrom. An inclined wall portion 145 extends upwardly above the body portion 143. The side edges of the inclined portion 145 are spaced from the flange portions 144 sufficiently to permit a metal sheet to be inserted therebetween. The upper end of each flange portion 144 is provided with an outwardly flared lip 146 which is adapted to releasably engage the upper lip portion 103 of the baseboard 14. The lower end of each flange portion 144 is provided with a shoulder portion 148 and a laterally extending guide portion 147. The lower end of the baseboard 14 slides on the guide portion 147 and snaps behind the shoulder portion 148, thus resiliently retaining the baseboard in assembled position. The spacer member is provided with a pair of downwardly extending legs 149, to grip and retain special mop strips applied over the baseboards (not here shown). The free edge of each flange portion 144 is provided with a shoulder 150 and a secondary flange 151. A pair of spaced lugs 152 having flared lips 153 are struck out from the secondary flange portion 151. The plinth blocks 18, 19 and 20 are removably held in position by the lugs 152. Spacer members 27 may also be positioned between posts to strengthen and stiffen the baseboards.

Figure 31:
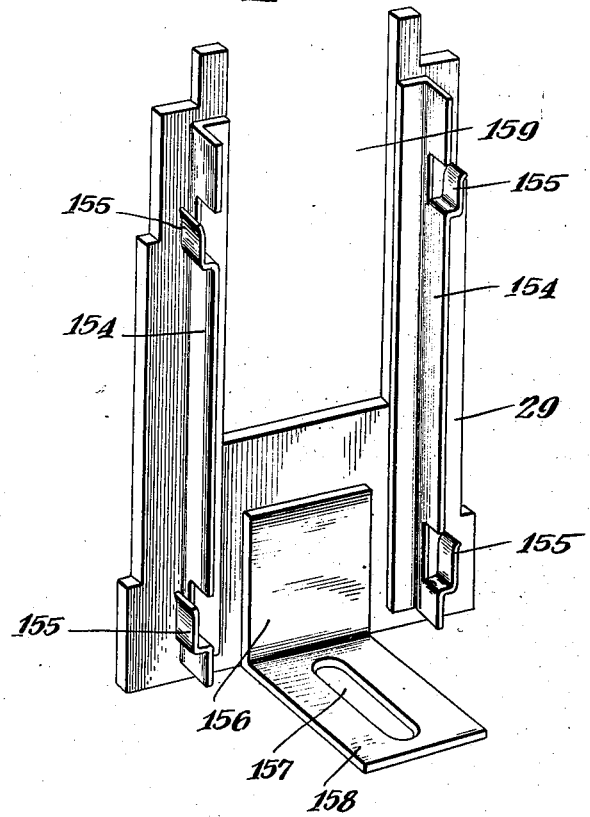
Fig. 31 is a perspective view of a spacer member of modified form used to secure the plinth at door openings and also at dead ends.

To hold the plinths 18 at door openings and at dead ends, a special spacer member 29 is provided, shown in perspective in Figure 31. This special spacer may be formed from a heavy metal plate having a side edge contour which conforms with the shape of the side edge 106 of the plinth block 18 which abuts the same. The plate may have a pair of angle pieces 154 welded thereto, each provided with an upper and a lower struck out lug 155 with which the plinth clips 107 and 108 may interlock. The special spacer is held in position by means of an angle bracket 156 having a slot 157 cut in the horizontal flange 158 thereof through which a floor screw may be inserted. The flange 158 is of such shape as to fit within the space between the arms of the floor plate portion 114 of the floor stud 21. An opening 159 is cut in the plate of sufficient width to permit the flange portion 98 of the door frame member 16 to extend therethrough, as shown in Figure 35. The outside face of the special spacer seats flush with the side edges of the plinth blocks. The flanges 98 of the door frame member which extend below the opening 159 may be cut off at the lower end to permit the door frame to extend to the floor.

The special spacer 29 may also be used at dead ends in the manner above described. In such event, the simple channel 28, shown in Figure 9, is crimped to the key members 7 so that the web portion of the channel is flush with the outside face of the special spacer 29. The channel is of sufficient length to fit snugly into the opening 159 in the spacer.

Figure 32:
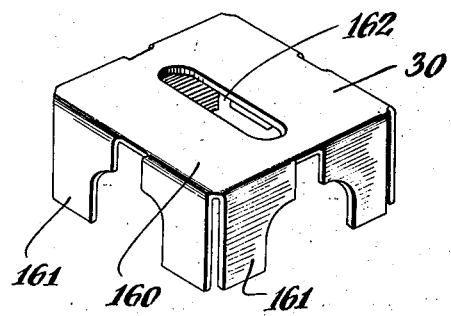
Fig. 32 is a perspective view of a block member used to secure the end of the cornice to the wall and the ceiling posts to the ceiling.

A simple block 30, shown in Figure 32, is used to hold the wall abutting end of the cornice in position, and to also hold the ceiling post secured to the ceiling. Block 30 may be stamped from a metal plate to provide a wall portion 160 and side flange portions 161 adapted to snugly fit within the end of the reinforcing beam constructed from the plates 11 and 12. A slot 162 is provided in the wall portion 160 through which a wall bolt may be inserted, as shown more particularly in Figure 44.

Assembling into sectional units

The manner in which the various parts are assembled together will now be described more particularly in connection with a metallic partition. Referring more particularly to Figure 1 there is shown a number of panels variously designated as G for glass, S for sheet metal, L for laminated material and P for packed panel. Since these types of panels are most commonly used, the structural assembly will be described in conjunction with them, although it is understood that the structural parts herein disclosed are adapted and suitable for use in connection with any type of panel of any thickness.

The glass panel G and the metal panel S are simply rectangular sheets of the material cut to the desired size. The packed panel comprises generally two rectangular sheets of metal 163 which are spaced apart and having filling material 164 positioned therebetween. The filling material may be corrugated paperboard, asbestos, weatherboarding, plaster or any other material. At the present time soundproof and fireproof partitions are finding particular favor, and materials which possess these qualities may be selected as desired. The thin laminated panel L may comprise a pair of spaced rectangular metallic sheets 163 with one or more layers of thin packing material 164 therebetween.

In assembling the structural unit in the plant the desired panel is selected and cut to the proper width and height. For purpose of illustration it will be assumed that a sectional unit is desired having a thin laminated panel at the bottom and a glass panel above the chair rail, as illustrated at the left hand side of Figure 1. In making this type of sectional unit, four key members 7 are selected and are cut to the same length so as to extend from the floor to the cornice. A pair of metallic base strips 167 of sheet metal are cut to the desired width and length. The ends of these base strips 167 are inserted into the paired key members 7 between flange portion 72 and wall portion 71 thereof. These parts are then secured together by means of a crimping tool (not shown), which crimps the flange portion 72, wall portions 71 and 75, and the end of the strip 167 firmly together. The crimping tool is provided with jaws for the purpose, which contact wall portion 75 and flange portion 76 of the key member when the end of the base strip is inserted therebetween. No other securing means are used. Before the base strips 167 are applied it may be convenient to secure a spacer channel 28 to each end of the spaced key members to hold them in proper spaced relationship.

It will be assumed that the groove 33 in the vertical channel member 1a is of the proper size to receive the laminated panel L. The flanges 32 of each vertical member 1a are inserted between the upturned flange portion 72 and the wall portion 71 and the paired key members 7, as shown more particularly in Fig. 2. These vertical members 1a extend from the base strips 167 to the chair rail. The assembly of paired key members with a connecting channel member will hereafter be referred to as a half post.

The horizontal member 3a is then telescoped over the spaced base strips 167, the ends thereof having first been cut to conform to the contour of the half posts above described. The laminated panel L can then be quickly slipped into place with the vertical edges thereof seating within the vertical grooves 33 and the lower edge thereof in the groove 47 of the horizontal framing member 3a. To form the chair rail, another horizontal member 3a of the proper length is selected and this member is positioned between the half posts seated on the upper edge of the laminated panel L. Strips 168 of sheet metal are then slipped in between the spaced flanges 43 and 44 of the horizontal member 3a, as shown for example in Figure 38. The ends of the metal strips 168 extend into the spaced key members 7 and are secured thereto by crimping the parts together. Then another horizontal member 3a is telescoped over the spaced strips 168 as shown in Figures 1 and 41, and the chair rail is completed.

Another pair of vertical channel members 1a is next selected, the grooves 33 of which are adapted to receive the glass panel G. These vertical members extend from the chair rail to the transom bar and each member is inserted between the paired key members 7 and secured thereto by crimping the parts together. The glass panel G is then inserted with the edges thereof fitted into the horizontal and vertical grooves.

The transom bar shown in detail in Figure 42 is then put in place. A narrow strip of sheet metal 169 is selected and the edges thereof inserted into the key members 7 and crimped thereto. The angular section 6, shown in detail in Figure 8, is then selected. The flange portion 64 thereof is of sufficient length to permit the ends thereof to extend into the key members 7, and are secured thereto by crimping. It is understood that the flange portion 64 is longer than the flange portion 65, which does not project into the key members. The molding member 5b is then placed into the position shown more particularly in Figure 42, with the lip portion 63 thereof seated over the end of the flange portion 65 of the angular member 6. The flange portion 68 of the angle piece 15 is then inserted between the flange portions 57 and 58 of the angular member 6. The molding 5a and the angle piece 15 may be secured together by welding if desired. After the glass has been put in place the removable molding 5a is secured in place by inserting the flange portion 67 between the spaced flange portions 65 and 66 of the angular member 6, with the seat portion 61 pressed against the outside face of the flange portion 66, as clearly shown in Fig. 42. The molding member 5a can be removed by an outward pull on the same and is inserted by simply pressing the member into sliding engagement with the flange portions 65 and 66 of the angular member 6. The transom bar is completed by telescoping another horizontal member 3a into engagement with the upper edge of the metal strip 169, and the upper edge of the flange portion 64.

A short vertical frame member 1a is then inserted into engagement with each pair of key members 7, and extends from the transom bar to the cornice. Glass panel G of the desired height is then inserted into position. It is now seen that by merely using short vertical members 1a, holes are provided in the half posts at places where it is desired to run conduits, as for example through the base portion, through the chair rail, and through the transom bar. These pieces can be cut to the proper length with little or no waste and no cutting of holes for the passage of conduits is necessary.

The top framing member of the sectional unit may be made up in a variety of different ways. For example, a horizontal frame member 2a may be selected in which event the flange portions 36 thereof extend beyond the web portion 35 sufficiently to permit the ends of the flange portion to extend into the key members, which can then be secured together by crimping. The upper edge of the glass panel seats within the groove 38. To further strengthen the construction key members 7 may be telescoped over the upstanding flanges 36 of the horizontal member 2a and crimped thereto.

Should it be desirable to make provision for the removal of the glass panel G, the removable molding combination 5a and 5b is used (see Figs. 42 and 44). In such event a narrow strip of metal 170, as shown more particularly in Figure 2, is provided, the ends of which extend into the key members 7 and are secured thereto by crimping, thus binding the upper ends of the half posts together. The fixed molding 5b is assembled to the strip 170 and the removable molding 5a and associated angle piece 15 is then telescoped into the angular piece 6 in the manner heretofore described. The key members 7 may then be telescoped over the upper edge of the strip 170 and the upper edge of flange portion 68, and the parts secured by crimping. The molding 5a thus assembled is removable so as to permit the insertion or removal of the glass panel G.

If a hinged or sliding transom window is to be provided above the transom bar it may be found desirable to incorporate in the construction the horizontal member 3c, having a stop portion 199 associated therewith. These parts may be assembled together as shown in Figure 42. This horizontal framing member may also be incorporated as part of the top horizontal frame of the sectional unit by use of a pair of metal strips 170 in the manner heretofore described. Or again, the horizontal member 2c having a stop portion 40 may be used, flange portions 36 of this member then extending into the spaced key members 7 and secured thereto by crimping. All different varieties of stationary, steel, glass, thin laminated and packed panels may be inserted above the transom bar in addition to the hinged or removable transom windows above described.

Sectional units of packed panel design are perhaps the easiest to assemble. The assembly of a sectional unit having a lower packed panel and an upper single sheet panel will now be described.

A packed panel of the desired width and height is provided. The key members 7 forming the half posts are then applied and crimped to the vertical edges of the metal sheets 163 forming the panel, as is evedent by referring to Figure 34. To permit this to be done the edges of the steel sheets 163 extend beyond the packing material 164. If a single sheet panel is to be inserted above the chair rail, the horizontal member 3b is selected and is telescoped over the top edges of the side wall sheets 163 comprising the packed panel.

The flange portions 32 of the vertical framing member 1a are now inserted into the spaced key members 7 and secured thereto by crimping. The frame members 1b extend from the member 3b, which constitutes the chair rail, to the cornice. The steel panel S is then slipped into place with the edges thereof fitted within the vertical frame members 1b and the horizontal framing member 3b. The top horizontal framing member of this sectional unit may be formed by using a horizontal framing member 1b having the flange portions 32 thereof of sufficient length to extend into the key members 7 so that they may be secured thereto by crimping. A pair of key members 7 are then telescoped over and crimped to the upstanding flange portions 32 of the horizontal frame member 1b to reinforce the same.

The right hand portion of Figure 1 shows a sectional unit having a packed panel extending from the floor to the cornice. The vertical edges of the lower packed panel is connected to the spaced key members 7 forming the half posts in the manner heretofore described. The horizontal rail member 4 is then selected, which is telescoped over the top edges of the lower packed panel. Metal strips 168 are then telescoped into the grooves provided in the horizontal member 4, the ends of these strips being crimped to the vertically extending key members. A second horizontal frame member 4 is then telescoped over the strips 168 and then the upper packed panel is inserted by telescoping the lower horizontal edges of the packed panel into engagement with the upper horizontal frame member 4. The vertical edges of the upper packed panel are then crimped to the key members 7. Horizontally extending key members 7 may also be secured to the upper edges of the upper packed panel to strengthen and reinforce the same.

Should it be desired to provide an angle in the partition structure, sheets 200, and 201, which have been cut to the desired length and suitably bent are assembled with the associated members in the manner above described. Wherever required suitably bent associated members are employed as will be obvious.

Should a panel having a door frame therein be desired, a pair of door frames 16 are selected. Key members 7 are then secured to the flanges 98 thereof, as shown in Figure 35. A horizontal top rail member may then be built up and connected to the half posts if a partition having a cornice directly above the door is desired. Otherwise, a transom bar is used, which is connected to the half posts. A door frame member 16 is incorporated therewith, as shown in Figure 42.

Thus it is seen that a vast variety of panel arrangements can be made from the few structural members herein shown and described. These various panel assemblies and combinations can readily be made by workers in the art and further assembled combinations will not therefore be described.

The various parts can be painted separately and then erected into sectional units or the sectional units may be given the final coat of paint when completely assembled. The sectional units with the necessary parts including baseboards, plinths, reinforcing beam, and securing devices are now ready for erection in the building.

*Erection in the field*

In erecting the partition in the field a chalk line is drawn on the floor to locate the partition run. Holes are drilled in the floor at the spaced points where a post member is to be erected. The floor studs 21 are then secured to the floor by stud bolts which extend through the key shaped apertures 120 therein. No thought need be given to the type of post to be mounted thereon. The stud is preferably positioned as shown in Figures 46 and 47. A master shim 22 is then slipped over each of the stud members 21.

Sectional units which have heretofore been made up at the plant to conform with the specifications are then positioned on the floor between the studs 21 with the lower end of each half post resting on the adjacent master shim 22 of adjacent studs. A female clip 25 is first connected by giving a simple twist to the clip in such a way that the slot portions 133 thereof slip over and hook lip portions 76 of the key members 7. The male clip 24 is then placed over the female clip and manipulated so that the lug portions 128 thereof extend along the outside walls 75 of the key members 7. The male and female clips are then pressed together and the half posts of adjacent sections are firmly locked together. Any number of cooperating paired clip members may be used. The paired clip members may be positioned at any place desired along the half posts since no deformation or special construction of the half posts is required to receive the paired clips. This is often of great advantage where an unusually strong connection is desired or where the sectional units must be pulled together when unusual strains develop. The paired clips at the lower end of sectional units are telescoped over the rounded stud portions 116 of the floor stud, as shown in Figures 49 and 50. The apertures 129 and 134 of the paired clips are so shaped as to conveniently fit around the stud. An unusually strong connection is thus effected.

At two-way, three-way and four-way intersections, the adjacent half posts of two, three or four sectional units are secured together by simply using a double pair of cooperating clips 24 and 25. A four decker stack of clips is applied one at a time with the male clips placed back to back, and the female clips on the top and bottom. This is made clear by referring to Figures 34, 38 and 39 of the drawings. The four clips are pressed together so that the lugs 130 of male clips 24 abut against the flanges 132 of the female clips 25.

Having thus erected and connected the sectional units, the cornice is next applied. The reinforcing beam formed from the plates 11 and 12 is laid across the top of the sectional units. The reinforcing beam is connected to each sectional unit by the use of clamps 26 which are inserted through adjacent apertures of the plates 11 and 12. The clamps are so positioned that the jaw portions 139 thereof grip together one corner of the reinforcing beam and the lip portion 76 of an adjacent key member. The clamps are preferably so arranged that the head of the screw 142 faces outwardly so that access can easily be had to the same with a screw driver. The strength of the clamp 26 is such that only a limited number of these devices are necessary for securing together an extended run of cornice. The clamps are preferably alternately applied first to one side and then the other side of the partition. If additional strength is necessary to meet unusual conditions, there is structural clearance within the beam to receive any type of splice or knee brace.

In event an unusually high partition is to be erected, a reinforcing beam is inserted between the half posts of adjacent sections, as shown in Figures 43, 44 and 45. The beam may extend from the floor to the ceiling, or from the ceiling to a short distance below the cornice, as desired. Clamps 26 are used to secure the beam to the adjacent key members 7 both above and below the cornice. When beams are used in the post, the cornice beam is cut off and if necessary, may be secured together by lap plates or other means. Clamps 26 are also used to secure the panels above the cornice to the ceiling posts or portions of the posts which extend above the cornice, as shown in Figures 43 and 44. Blocks 30 are secured to the wall or ceiling and the end of the beam telescoped therefrom, holding the cornice end or ceiling post, as the case may be, securely in place.

The post caps 9 and 10 are then snapped into place. This is a very simple operation since the clip portions 78 are resilient and readily grasp the shoulder portions 74 of adjacent key members. If an inside corner condition arises the post molding 8 is similarly snapped into place, the paired grooves 83 thereof gripping the shoulder portion 74 of adjacent key members, as clearly shown in Figures 34, 38 and 39. In the case of the two-way post, a molding 8 is held onto the outer corner of the post, as shown in Figure 39, by the male and female clip members. The slots 133 in the female clip engage the lips 85 of the molding and the oppositely extending lug portions 128 of adjacent male clips 24 grip or engage the inside walls of the molding 8, and thus retain the molding in place. The corner post caps 9 are snapped into place with the flared flange portion 81 thereof gripping the adjacent groove 83 in the post molding. The molding member is applied before the corner post caps 9.

The baseboards 14 and plinths 18, 19 and 20 may now be applied. This is effected by positioning a spacer member 27 on each side of every post with the flanges 151 engaging the faces 69 and 70 of the key members 7. The lower edges of the base strips 167 or the lower edges of the packed panel (whichever it may be) extend between the vertical edges of the inclined wall portion 145 and the flange portions 144 of the spacer member. The upper lip portion 103 of the baseboard 14 is hung over the lip 146 of the spacer member. The lower edge of the baseboard is then forced inwardly until the lip portion 102 thereof snaps behind the shoulder portion 148 of the spacer member. The plinths are then positioned adjacent the post caps and forced downwardly until the lug portions thereof (lug portions 107 and 108 in the case of a straight run plinth, and lug portions 112 and 113, in the case of a corner plinth) engage the upper and lower lugs 152 of adjacent spacer blocks. The inside corner plinth 20 is then slipped into place at the inside corners of three-way and four-way posts so that the flange portions 115 thereof seat behind the ends of the baseboards 14. At door openings and dead ends the special spacer 29 is used. The ears 107 and 108 of the plinth 18 interlock with the lugs 155 of the special plinth. The door frame section and the dead end section is shipped to the field as a set up unit.

As a final gesture the cornice facing members 13 are snapped into place over the reinforcing beam. Engagement is effected between resilient lip portions 95 and 96 of the facing member and the groove portion 90 of the reinforced beam.

Summary

The vast variety of structural combinations which can be effected by these few members is appreciated when reference is made to the drawings. The interchangeability of the panel sections at the posts is illustrated in Figures 33, 34, 35, 38 and 39. The fragmentary portions of the panels between the posts here shown are exploded away from different types of post structures, such as the straight-way, two-way, three-way, four-way, door frame and dead end post arrangements. It will be appreciated that any form of panel may be used as long as the outwardly extending flanges thereof are properly spaced so as to telescope into the spaced key members 7.

The interchangeability of panels at the chair rail is shown in Figure 41, where a number of fragmentary panel parts are shown exploded away from the chair rail. Figure 42 likewise illustrates the interchangeability of panels at the transom bar, panel parts being shown in exploded view. At the cornice, the same interchangeability of panels is permissible, as shown in Figure 40. This figure also illustrates how a super-structure can be built above the cornice and fitted together therewith, the cornice structure being susceptible of receiving all the various different kinds of panels therebetween. If desired, weatherboarding 161 can be used to fill the gap between the cornice and the ceiling, as shown in Figure 40. In event this type of super-structure is selected, the weatherboarding may be mounted on top of the cornice facing members 13 and the weatherboarding may then be plastered and painted if desired.

A partition of unusual strength can be made by inserting a beam member, composed of the plates 11 and 12, into each post. These reinforcing beams may extend from the ceiling downwardly into the post, and may go completely to the floor if desired. When the reinforcing beam is used, the key members 7 are secured thereto by the clamps 26, the paired clips 24 and 25 then not being used. It is thus seen that innumerable types of partition structures can be erected by the cooperating interplay and interchangeability of the various simple structural members and parts described.

Conduits and wiring can be strung through all parts of the partition either during or after erection. The plinth blocks and baseboards can be lifted upwardly with a simple prying tool and removed, permitting full access to the base portion of the partition. The conduits may be placed within the base and run through the large apertures provided in the inclining wall portions 145 of the spacer members 27. Conduits may be run up or down all types of posts by simply removing the post caps, which may be pried loose with a simple tool. Conduits may be run through the apertures provided in the lower plate member 12, and then continued within the cornice reinforcing beam the full length thereof. Or, if desired, the conduits may be run from the hollow posts through the chair rail and the transom bar. It will be noted that no holes need be cut in the half posts at the chair rail, transom bar or base to receive conduits, since separate vertical post forming members are used. Conduit openings are thus formed without labor and a decided saving in material is also effected thereby.

The partition herein disclosed possesses unusual strength to resist lateral thrusts due to the fact that the cornice beam and the upper horizontal framing portion of the sectional units are clipped and bound together, thus taking advantage of the thrust resisting strength of both. Long lengths of key members 7 may be run horizontally across a number of sectional units and crimped thereto in the manner heretofore described. The individual sectional units are then connected together by the lock-seamed key members 7, as well as by the cornice beam itself. A partition of great strength may thus be developed.

The entire partition is erected without screws, bolts, welding or nuts (except the screw 142 which is used to manipulate the jaws 139 of the clamp 26 and is not removed). Tapping of holes or careful fitting and location of holes is not required. The securing devices used all comprise simple stampings and are inexpensive to make. No checking, detailing or engineering is required in connection therewith, since each device is designed to fully satisfy all conditions which may arise in the various structural types. Furthermore, they may all be shipped to the place of installation in separate compartments, boxes or barrels without counting or tabulating them. The number required can be estimated by either volume or weight, the same as is done in the case of nails, screws or bolts. An installation can be very quickly erected with these simple devices and an incalculable saving in confusion and annoyance, so common in devices heretofore used, is effected.

The general shape and design of the various facing members may be changed without effecting the structural efficiency and interchangeability of the assembly. The thickness of the partition can be varied by varying the grooves in the channel members shown in Figures 3 to 9, inclusive. The structure is thus expansible in three directions.

The exposed face portions of the baseboard, the plinths, the post caps and the cornice members can be given any variety of artistic shape and design. Different models of the structure can be easily furnished by making a slight change in these visible facing members. A further departure in design can be effected by changing the shape of the exposed face portions of the horizontal framing members and of the vertically and horizontally positioned key members 7. Unlimited flexibility of design can be economically and effectively realized.

Color contrasts of infinite variety may be brought out at little or no extra expense. The post caps, baseboards and cornices may be painted before assembly in the field with colors which harmonize or contrast with the panel colors. Further color harmony or contrast may be brought out by painting the horizontal framing members as well as the metal strips which connect them before assembling these parts together. Contrast or harmony coloring of infinite variety can thus be effected on a production scale by coloring the separate parts before assembly. Thus great flexibility of coloring is accomplished at little, if any, additional cost. In the prior art structures, color contrasts could be brought out only with the artist's brush after the assembly had been constructed.

The structural assembly herein disclosed can be assembled at the factory on a production basis and with great economy. Only a few different types of members need be carried in stock. The few securing devices needed comprise inexpensive stampings which can be kept in bins without special checking or inventory. Minimum engineering service only is required to fill orders due to the extreme flexibility of the parts. Careful fitting of the parts is not required. Highly skilled labor is not needed. A large volume output can be effected in a small factory with limited floor space, limited inventory and with limited machinery. All these production economies are made possible and in addition a superior product is produced, which is stronger in construction, permits greater flexibility in design than structures heretofore made. The structural assembly can be made into an object of marked beauty, and when erected in the field, conduits of great size can be run through the same in all directions. The assembly can be made of any bendable material, such as steel, aluminum, copper, brass, Monel metal and the alloy metals thereof. Parts of the structure can also be made of different metals if desired, to obtain artistic effects.

The various structural parts herein disclosed may be made up into a large variety of structures, such as interior and exterior cabinets and racks for stores, warehouses and storage rooms, interior and exterior furniture of all types and descriptions, exterior and interior building trim, wainscoting, wall facings, knockdown houses and buildings, structural framing and other objects.

While certain novel features of the invention have been disclosed and are pointed out in the annexed claims, it will be understood that various omissions, substitutions and changes may be made by those skilled in the art without departing from the spirit of the invention.

What is claimed is:

1. A structural post including in combination, a plurality of independent key members, channels connecting said key members into pairs, and clip devices connecting said pairs together to form a post.

2. A cornice construction including in combination, a hollow beam member, inclined shoulder portions integrally formed along the side edges of said beam member, and cornice facing members adapted to snap over and resiliently engage said shoulder portions.

3. A cornice construction including in combination, a hollow beam member, shoulder portions integrally formed along the side edges of said beam member and a cornice facing member having lip portions adapted to resiliently engage said shoulder portions to removably secure said facing member thereto.

4. A post construction for partition walls intersecting at less than 180° angle, comprising framing members, a molding forming the outside corner of said post, clip members removably securing said framing members and said molding in assembled relationship, and post caps covering the exposed faces of said post.

5. In partition construction, a sectional unit including, a pair of key members positioned at each side edge of said unit, a lower panel member extending between the paired key members and crimped thereto, a chair rail telescoped over said lower panel member, and an upper panel member positioned above said chair rail extending between and crimped to said key members.

6. In partition construction, sectional units which include, a pair of key members at each side edge of said units, a spacing channel connecting each pair of key members, a hollow frame member positioned between the key members of adjacent panels, means for connecting said key members to said frame member, said frame member providing an open communication for conduits and the like.

7. A partition structure comprising a plurality of key members each having a tubular portion adapted to be exposed as a wall surface, a flange and a groove, means engaging the flanges of said key members for securing them together to constitute a structural element and a panel member having flanged edges adapted to enter said grooves.

8. A partition structure comprising in combination a panel-stretcher, a plurality of key members each having a tubular portion having faces adapted to be exposed as wall surfaces, a flange and a groove, clip means engaging said flange and securing said key members in spaced pairs, a channel having flanges seated in the grooves of a pair of said key members and having a grooved web receiving said panel-stretcher, one of the faces of each of the pair of key members being flush with said web.

9. A partition structure comprising in combination, a plurality of key members each having a groove, a plurality of channel members having flanged edges adapted to enter the grooves in said key members, the web portions of said channel members being of equal width, at least one of said channel members having a web with a relatively wide groove for receiving a glazed panel stretcher, and another of said channel members having a web with relatively narrow groove for receiving a thin metal panel-stretcher.

10. A partition structure comprising in combination, a plurality of key members providing grooves, a plurality of channel members having flanged edges adapted to enter said grooves, the web portions of said channel members being of equal width, at least one of said channel members having a web with a groove for receiving a glazed panel-stretcher, another channel member having a web with a groove for receiving a metal panel-stretcher and another channel member having a web with an upstanding flange constituting a stop.

11. A partition structure comprising in combination, a plurality of key members each having a groove, a plurality of channel members having flanged edges entering said grooves and maintaining said key members in spaced relationship, the web portions of said channel members being of equal width but variously formed to receive glazed panel-stretchers, to receive metal panel-stretchers, to constitute door bucks, and to constitute transom bucks, packed panel-stretchers having facing members spaced apart a width equal to said flanged edges and means securing said key members together to constitute posts.

12. A key member for a partition structure comprising a single piece of sheet metal formed with a tubular portion having a substantially flat exterior wall, a flange extending substantially parallel to said exterior wall to define a groove and a second flange extending outwardly from the base of said first flange.

13. A key member for a partition structure comprising a single sheet of metal formed with a shoulder portion, a groove defined by substantially parallel extending wall portions and a flange extending outwardly from a portion of the member adjacent the bottom of said groove.

14. A metal partition structure comprising in combination, a plurality of key members, clip means securing said key members in spaced, paired relation and a channel extending between each pair of key members.

15. A metal partition structure comprising in combination, a plurality of key members, each having a groove formed therein and a flange extending therefrom, clip means engaging said flanges to secure said key members in spaced paired relation, and a channel for each pair of key members having flanged edges seated in the grooves of said key members.

16. A partition structure comprising in combination, a plurality of key members, clip means joining said key members in spaced pairs to form a post, channels interengaging with the members of each pair, and post caps resiliently engaging and extending between members of different pairs.

17. A partition comprising in combination a plurality of key members each having a flange, a clip member engaging said flanges to secure said key members in spaced pairs, and a channel extending between and interlocked to the key members of each pair respectively.

18. In combination, a metal partition structure comprising a plurality of key members each having a shoulder, a groove and a flange, clip means engaging said flanges to secure said key members in spaced paired relation, a channel member having flanges seated in said grooves, and a post cap resiliently engaging the shoulders of two non-paired key members.

19. In combination, a post for a metal partition structure comprising a plurality of key members, each having a shoulder portion and a groove, and means seated in said grooves for securing said key members in spaced paired relation, and a post cap covering a face of said post and having at least one edge resiliently engaging a shoulder portion.

20. A partition structure comprising in combination a plurality of vertical post elements, a pair of spaced, oppositely facing channel members extending between said post elements and each having a grooved web and grooved edge portions, a plate element seated in and extending between corresponding grooved edge portions of said channel members, and a panel-stretcher seated in each of said grooved webs.

21. A partition structure comprising a reinforcing beam including a pair of relatively flat plates, and a pair of plates having flanges engaging said flat plates, a structural member adapted to receive a panel-stretcher, and means securing said structural member to said reinforcing beam.

22. A partition construction comprising a pair of posts, a pair of molding members extending between said posts on opposite sides of the partition and having overlapping flanges defining an abutment for a panel-stretcher and portions to be exposed as wall surfaces, a member extending from one of said portions to said flanges and interposed between said flanges, and a panel-stretcher rested against said abutment.

23. In a partition structure, a sectional unit including spaced sheet metal panel members, and frame members of generally tubular form positioned along opposite edges of said panel members, said frame members providing spaced recesses enclosing the adjacent edges of said panel members, and means for securing said frame and panel members together in assembled relationship.

24. In a wall structure, an assembled panel unit including, a pair of frame members of generally tubular form, a channel member extending between and having crimped attachment to said frame members, and a panel stretcher extending from said channel member.

25. A partition panel unit including, a pair of spaced side wall forming sheet metal members, a tubular member engaging the opposite side edges of each of said sheet members, and means for retaining said sheet members in fixed spaced relationship.

26. In a wall structure, a post formed from three or more spaced apart closed self-reenforcing metal tubing members, clip devices connecting said members together to form a post, and post caps extending between and resiliently secured to certain of said members.

27. In a wall structure, a metallic cornice beam of tubular form having abutment portions, a panel unit interfitting with said abutment portions, detachable clamping devices securing said beam and said panel unit together in unitary thrust-resisting assembly, said clamping devices being releasable from said beam member to permit removal of said panel unit, and a facing member connected to said beam and overlapping a portion of said panel unit.

28. In a wall structure, tubular framing elements having inturned lip portions, and clip devices lying in a plane substantially at right angles to said framing elements engaging said inturned lip portions to retain said tubular framing elements in fixed spaced relationship.

29. In a wall structure, a framing member including a pair of spaced closed tubular elements, each of said elements having a shoulder portion, clip means securing said elements together, and a cap member extending between said tubular elements and held in position by resilient engagement with said shoulder portions.

30. A structural post including a plurality of closed self-reenforced sheet metal tubing elements having a shoulder portion formed thereon, a clip securing said elements together, a cap extending between said elements, said cap having means along the edges thereof adapted to resiliently engage said shoulder portions to removably secure the cap member in assembled position.

31. A structural beam comprising a pair of plate members having flanged side edges, a second pair of plate members having planar side edges, said first pair of plate members having its flanged edges lying in the principal plane of the plate members of said second pair, the edges of adjacent plate members being crimped together to securely lock the members in rigid assembled relationship to form a tubular beam.

32. In partition construction, a sectional unit including, a pair of tubular frame members at each side edge of said unit, and a panel member having the side edges thereof rigidly secured in recesses provided in said frame member by crimps formed therein after assembly thereof.

33. In partition construction, a sectional unit which includes a pair of tubular frame members, a spacing channel having the side flanges thereof frictionally gripped within recesses provided in said frame members, and a panel stretcher abutting said channel.

34. In a wall construction, spaced frame members, cooperating clip elements lying in substantially the same plane and substantially at right angles to said frame members, the side edges of said clip elements having portions cooperating to maintain said frame members in rigid assembled relationship.

35. In partition construction, adjacent panel units and a pair of cooperating clip elements lying in planes substantially at right angles to said panel units, each of said clip elements being provided adjacent its four corners with cooperating panel-engaging portions adapted to releasably engage said adjacent panel units to retain the same in fixed assembled relationship.

36. In partition construction, adjacent panel units each including panel members and post uprights connected thereto, paired connecting clips lying in substantially parallel planes and substantially at right angles to said panel members, each clip having portions adjacent their corners for releasable engagement with the uprights of adjacent units, and a cap member covering the space between adjacent uprights.

37. In partition construction, a plurality of vertical frame elements, a plurality of cooperating clips arranged in substantially horizontal planes and disposed substantially at right angles to said frame elements, said clips having cooperating portions adapted to releasably engage said frame elements, panels engaging said frame elements, and cap members spanning the space between said frame elements.

38. In partition construction, a plurality of panel units having their upright edges adjacently arranged, each of said panel units having inturned lip portions along their adjacent upright edges, paired clips lying in planes substantially at right angles to said panel units for connecting the adjacent upright edges of said panel units in assembled relationship, each pair of clips including a female element adapted to receive certain of said lip portions and a male element holding said lip portions in fixed engagement with said female element, said pair of clips being so formed that one pair operates to connect the adjacent edges of two panel units together and a similar additional pair of clips connects the adjacent edge of a third panel in assembled position to said first and second panel units.

39. In a wall structure, two pairs of frame elements, clip means securing said frame elements in fixed spaced relationship to form a post assembly, panels extending from opposite sides of said post assembly, each of said panel members having a channel member extending along the adjacent sides of said post, each of said frame elements having a groove adapted to receive a flange of a channel member.

40. In a partition structure, a plurality of panel stretchers, a plurality of channel members each having a groove in the web portion thereof to receive the adjacent edge of one of said panel stretchers, a pair of frame elements engaging the respective flanges of each of said channel members, and means for securing said frame elements together in fixed assembled relationship.

41. In a metallic partition structure, a pair of spaced wall forming sheet metal panel members, a channel-shaped rail member having spaced recesses formed by double return bends formed in the flange portions of said rail member, said double return bends enclosing adjacent edges of said panel members, and a panel receiving recess in the web portion of said channel-shaped rail member.

42. A partition structure comprising in combination, a plurality of spaced post elements, and a rail member extending between said post elements, said rail member including opposed channels each having a groove in the flanges thereof formed by a double return bend, panel stretchers seated in said grooves, and a panel receiving groove in the web portion of said channels.

43. In partition construction, a pair of panel units having upright edges arranged in adjacent relationship, said panel units having inturned lip portions along the adjacent upright edges thereof, paired clips for connecting the adjacent upright edges of said panel units in assembled relationship, said paired clips comprising a female element adapted to receive said lip portions, and a male element holding said lip portions in fixed engagement with said female element, said male and female elements lying substantially in the same plane and substantially at right angles to said panel units.

44. In a partition structure, uprights, a rail member of generally channel form extending between said uprights, said rail member having a web portion and flange portions, a pair of spaced sheet metal panel members, said flange portions having recesses formed by a double return bend therein adapted to enclose the adjacent edges of said panel members, a panel-receiving recess in said web portion, and a panel having an edge portion thereof seated in said recess.

45. In a partition structure, spaced sheet metal panel members, and frame members positioned along opposite edges of said panel members, each of said frame members having spaced recesses, each recess being formed by a double return bend of the metal, said recesses enclosing and retaining the adjacent edges of said panel members in assembled relationship, said frame members and said sheet metal panel members adapted to receive separate color treatments prior to assembly.

46. A partition construction comprising a pair of posts, a horizontal frame member extending between said posts and including a channel having a grooved web and grooved flanges, a pair of molding members having grooved side flanges and inwardly extending flanges defining a seat for a panel-stretcher, structural members seated in the grooved flanges of said channel and molding members, and a panel-stretcher disposed in said seat.

EDWARD NICHOLAS WINSLOW.